(12) United States Patent
Liu et al.

(10) Patent No.: US 10,724,983 B2
(45) Date of Patent: Jul. 28, 2020

(54) SENSOR DEVICE AND A METHOD FOR FORMING THE SENSOR DEVICE

(71) Applicant: GLOBALFOUNDRIES Singapore Pte. Ltd., Singapore (SG)

(72) Inventors: Bin Liu, Singapore (SG); Eng Huat Toh, Singapore (SG); Shyue Seng Tan, Singapore (SG); Ming Tsang Tsai, Singapore (SG); Khee Yong Lim, Singapore (SG); Kiok Boone Elgin Quek, Singapore (SG)

(73) Assignee: GLOBALFOUNDRIES Singapore Pte. Ltd., Singapore (SG)

( * ) Notice: Subject to any disclaimer, the term of this patent is extended or adjusted under 35 U.S.C. 154(b) by 15 days.

(21) Appl. No.: 16/215,688

(22) Filed: Dec. 11, 2018

(65) Prior Publication Data
US 2020/0182826 A1 Jun. 11, 2020

(51) Int. Cl.
*G01N 27/414* (2006.01)

(52) U.S. Cl.
CPC ..... *G01N 27/4148* (2013.01); *G01N 27/4145* (2013.01)

(58) Field of Classification Search
CPC ............. G01N 27/414; G01N 27/4148; G01N 27/4145; G01N 27/3276; G01N 27/327; G01N 27/4165; G01N 27/4166; G01N 33/5438; H01L 2924/13072; H01L 2924/13073; H01L 2924/13074; A61B 5/14539; A61B 5/14546
See application file for complete search history.

(56) References Cited

U.S. PATENT DOCUMENTS

| 9,689,835 B2 | 6/2017 | Liu et al. |
| 9,835,634 B2 | 12/2017 | Bashir et al. |
| 2016/0153932 A1* | 6/2016 | Eklund ................ G01N 27/414 |

OTHER PUBLICATIONS

Cheng-En Lue et al., "Optimization of Urea-EnFET Based on Ta2O5 Layer with Post Annealing", Sensors, 2011, 11, pp. 4562-4571, ISSN 1424-8220.
Jonghyun Go et al., "Coupled Heterogeneous Nanowire-Nanoplate Planar Transistor Sensors for Giant (>10 V/pH) Nernst Response", ACS Nano, 2012, pp. 5972-5979, vol. 6, No. 7.

(Continued)

*Primary Examiner* — Hsien Ming Lee
(74) *Attorney, Agent, or Firm* — Viering Jentschura & Partner MBB

(57) ABSTRACT

A sensor device may include a substrate, first and second source regions, first and second drain regions, first and second channel regions, and first and second gate structures disposed over the first and second channel regions, respectively. The source regions and drain regions may be at least partially disposed within the substrate. The first and second source regions may have first and second source resistances, respectively, and the second source resistance may be higher than the first source resistance. The first gate structure may receive a solution, and a change in pH in the solution may cause a change in a first current flow through the first channel region. In turn, the second current flow through the second channel region may change to compensate for the change in the first current flow to maintain a constant current flow through the sensor device.

20 Claims, 15 Drawing Sheets

(56) References Cited

OTHER PUBLICATIONS

Jonghyun Go et al., "Beating the Nernst limit of 59mV/pH with Double-Gated Nano-Scale Field-Effect Transistors and Its Applications to Ultra-Sensitive DNA Biosensors", IEDM10, 2010, pp. 8.7.1-8.7.4, IEEE.
M. Spijkman et al., "Beyond the Nernst-limit with dual-gate ZnO ion-sensitive field-effect transistors", Applied Physics Letters 98, 2011, 043502, 4 pages.
Pragya Kushwaha, "Modeling of Substrate Depletion, Self-heating, Noise and High Frequency Effects in Fully Depleted SOI MOSFETs", Oct. 2016, 153 pages.
Y.-J. Huang et al., "High Performance Dual-Gate ISFET with Non-ideal Effect Reduction Schemes in a SOI-CMOS Bioelectrical SoC", IEDM15, 2015, pp. 29.2.1-29.2.4, IEEE.

* cited by examiner

SENSOR DEVICE AND A METHOD FOR FORMING THE SENSOR DEVICE

TECHNICAL FIELD

The present disclosure relates generally to sensor devices and methods for forming the sensor devices.

BACKGROUND

Sensors are often used in biomedical processes for converting biochemical reactions into electrical signals, for example, converting pH changes in a solution caused by biochemical reactions into electrical signals. Prior art sensors include ion-sensitive field-effect transistors (ISFETs), which can convert biochemical reactions into electrical signals with a certain degree of effectiveness. The use of ISFETs helps to achieve lower cost, higher throughput and a label free biomolecule detection. Further, ISFETs can be manufactured using mainstream CMOS technology. However, the sensitivity of conventional ISFETs is often defined by 59 mV/pH, which is the Nernst limit associated with an electrolyte and a site-binding surface. Such a sensitivity level may not be adequate for some applications such as human genome sequencing.

To date, various sensors with improved sensitivity have been developed for use in biomedical processes. Examples of such sensors include dual gate ISFETs having an additional back gate and sensors having dual transistors.

FIG. 1A shows a top view of a prior art sensor 100. The prior art sensor 100 is in the form of a coupled ISFET, and FIG. 1B shows a cross-sectional view of the prior art sensor 100. As shown in FIGS. 1A-1B, the prior art sensor 100 includes a first transistor 102 and a second transistor 104. The first transistor 102 includes a nano-plate 106 having a gate structure 108 in contact with a solution 110. The gate structure 108 includes a sensing element and a gate oxide layer. The second transistor 104 includes a nanowire 112 having a gate electrode 114 over a gate oxide layer 113. In use, the drain regions 116/118 of the first and second transistors 102, 104 are electrically coupled to a common voltage supply $V_{DD}$, and the source regions 120/122 of the first and second transistors 102, 104 are electrically coupled to a current source 123 configured to provide a constant current flow $I_D$ through the sensor 100. The current flow $I_D$ splits into a first current flow through the first transistor 102 and a second current flow through the second transistor 104. The gate structure 108 of the first transistor 102 is configured to receive a voltage $V_{G,1}$ based on a pH of the solution 110 and is further configured to control the first current flow through the first transistor 102 based on the voltage $V_{G,1}$. When a pH of the solution 110 changes, the voltage $V_{G,1}$ changes and the first current flow through the first transistor 102 changes. To maintain the combined current flow $I_D$ constant, the second current flow through the second transistor 104 changes to compensate for the change in the first current flow through the first transistor 102. This in turn changes the voltage $V_{G,2}$ at the gate electrode 114 of the second transistor 104. The pH changes in the solution 110 are detected based on the amount of change in $V_{G,2}$ to maintain the constant combined current flow $I_D$.

Although prior art sensors, such as sensor 100, are capable of converting biochemical reactions into electrical signals by detecting pH changes in a solution, it would be useful to further improve the sensitivity of the sensors. One way to achieve higher sensitivities is to scale up one or more dimensions of the sensors, but this can cause an undesirable increase in the sensor sizes.

SUMMARY

According to various non-limiting embodiments, there may be provided a sensor device. The sensor device may include a substrate, a first semiconductor structure, and a second semiconductor structure. The first semiconductor structure may include a first source region that may be at least partially disposed within the substrate, a first drain region that may be at least partially disposed within the substrate, a first channel region that may be between the first source region and the first drain region, and a first gate structure that may be disposed over the first channel region. The first gate structure may be configured to receive a solution, and a change in pH in the solution may cause a change in a first current flow through the first channel region. The second semiconductor structure may include a second source region that may be at least partially disposed within the substrate, a second drain region that may be at least partially disposed within the substrate, a second channel region that may be disposed between the second source region and the second drain region, and a second gate structure that may be disposed over the second channel region. The sensor device may be configured, such that when the first current flow through the first channel region changes due to the change in pH in the solution, a second current flow through the second channel region changes to compensate for the change in the first current flow through the first channel region to maintain a constant current flow through the sensor device. The first source region may have a first source resistance, and the second source region may have a second source resistance. The second source resistance may be higher than the first source resistance.

According to various non-limiting embodiments, there is provided a method that may include obtaining a substrate having a first semiconductor structure formed thereon. The first semiconductor structure may include a first source region that may be at least partially disposed within the substrate, a first drain region that may be at least partially disposed within the substrate, a first channel region that may be between the first source region and the first drain region, and a first gate structure that may be disposed over the first channel region and that may be configured to receive a solution. A change in pH in the solution may cause a change in a first current flow through the first channel region. The method may further include forming a second semiconductor structure that may include disposing a second source region at least partially within the substrate, disposing a second drain region at least partially within the substrate, disposing a second channel region between the second source region and the second drain region, and disposing a second gate structure over the second channel region. The sensor device may be configured such that when the first current flow through the first channel region changes due to a change in pH in the solution, the second current flow through the second channel region changes to compensate for the change in the first current flow through the first channel region to maintain a constant current flow through the sensor device. The first source region may have a first source resistance, and the second source region may have a second source resistance. The second source resistance may be higher than the first source resistance.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. Embodiments of the invention will now be illustrated for the sake of example only with reference to the following drawings, in which.

DETAILED DESCRIPTION

Figure 1B:
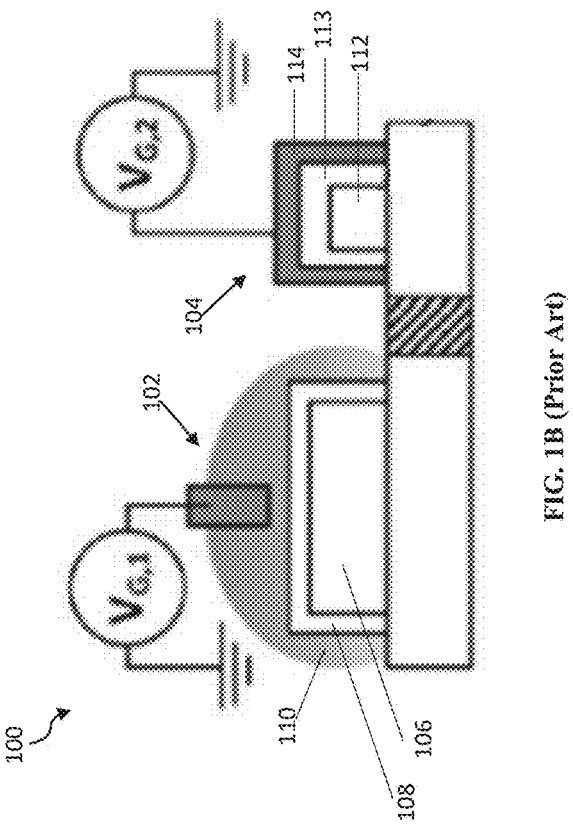
FIG. 1A and FIG. 1B respectively show a top view and a cross-sectional view of a prior art sensor.
Figure 1A:
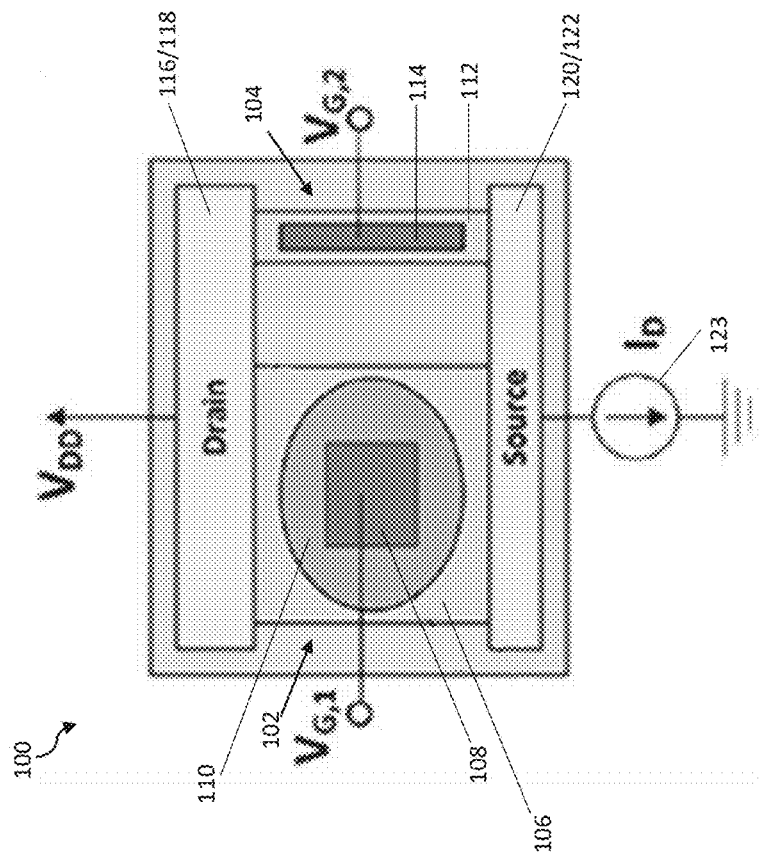

The embodiments generally relate to devices, such as semiconductor devices. More particularly, some embodiments relate to sensor devices employed to convert biochemical reactions into electrical signals, for example, to convert a pH change in a solution caused by biochemical reactions into electrical signals. The sensor devices can be used as biosensors and can incorporated into, for example, medical devices for measuring a change in pH, DNA sequencing, and/or applications related thereto.

According to various non-limiting embodiments, a sensor device may include a substrate, a first semiconductor structure, and a second semiconductor structure. The first semiconductor structure may include a first source region that may be at least partially disposed within the substrate, a first drain region that may be at least partially disposed within the substrate, a first channel region that may be between the first source region and the first drain region, and a first gate structure that may be disposed over the first channel region. The first gate structure may be configured to receive a solution, and a change in pH in the solution may cause a change in a first current flow through the first channel region. The second semiconductor structure may include a second source region that may be at least partially disposed within the substrate, a second drain region that may be at least partially disposed within the substrate, a second channel region that may be disposed between the second source region and the second drain region and a second gate structure that may be disposed over the second channel region. The sensor device may be configured such that when the first current flow through the first channel region changes due to the change in pH in the solution, a second current flow through the second channel region changes to compensate for the change in the first current flow through the first channel region to maintain a constant current flow through the sensor device. The first source region may have a first source resistance, and the second source region may have a second source resistance. The second source resistance may be higher than the first source resistance.

According to various non-limiting embodiments, the second source resistance may range from 1 kOhm to 500 kOhms.

According to various non-limiting embodiments, the first drain region may include a first drain resistance, the second drain region may include a second drain resistance, and the second drain resistance may be higher than the first drain resistance.

According to various non-limiting embodiments, each of the first source region and the second source region may include one or more dopants, and the second source region may include a lower concentration of dopants as compared to the first source region.

According to various non-limiting embodiments, each of the first drain region and the second drain region may include one or more dopants, and the second drain region may include a lower concentration of dopants as compared to the first drain region.

According to various non-limiting embodiments, the second source region may include a concentration of dopants lower than $1\times10^{19}/cm^3$.

According to various non-limiting embodiments, the second drain region may include a concentration of dopants lower than $1\times10^{19}/cm^3$.

According to various non-limiting embodiments, the first source region may include one or more silicides and one or more silicides may be absent from the second source region.

According to various non-limiting embodiments, the first drain region may include one or more silicides and one or more silicides may be absent from the second drain region.

According to various non-limiting embodiments, a width of the second source region may be less than a width of the first source region.

According to various non-limiting embodiments, a width of the second source region compared to a width of the first source region may have a ratio ranging from 1:1 to 1:1000.

According to various non-limiting embodiments, a width of the second drain region may be less than a width of the first drain region.

According to various non-limiting embodiments, a width of the second drain region compared to a width of the first drain region may have a ratio ranging from 1:1 to 1:1000.

According to various non-limiting embodiments, the sensor device may further include a source terminal for electrical connection of the second source region to an external voltage supply and may further include a resistance element between the second source region and the source terminal.

According to various non-limiting embodiments, the substrate may include a first well and a second well, and the first source region and the first drain region may be at least partially disposed within the first well, and the second source region and the second drain region may be at least partially disposed within the second well.

According to various non-limiting embodiments, the sensor device may include a single source terminal for electrical connection of the first source region and the second source region to an external voltage supply.

According to various non-limiting embodiments, the sensor device may include a further substrate arranged below the substrate and an oxide layer between the substrate and the further substrate.

According to various non-limiting embodiments, the sensor device may further include a third gate structure that may be at least partially disposed within the further substrate. The third gate structure may be configured to receive a first bias voltage to affect the first current flow through the first channel region.

According to various non-limiting embodiments, the sensor device may further include a fourth gate structure that may be at least partially disposed within the further substrate. The fourth gate structure may be configured to receive a second bias voltage to affect the second current flow through the second channel region.

According to various non-limiting embodiments, a method may include obtaining a substrate having a first semiconductor structure formed thereon. The first semiconductor structure may include a first source region that may be at least partially disposed within the substrate, a first drain region that may be at least partially disposed within the substrate, a first channel region that may be between the first source region and the first drain region, and a first gate structure that may be disposed over the first channel region and that may be configured to receive a solution. A change in pH in the solution may cause a change in a first current flow through the first channel region. The method may further include forming a second semiconductor structure that may include disposing a second source region at least partially within the substrate, disposing a second drain region at least partially within the substrate, disposing a second channel region between the second source region and the second drain region and disposing a second gate structure over the second channel region. The sensor device may be configured such that when the first current flow through the first channel region changes due to a change in pH in the solution, the second current flow through the second channel region changes to compensate for the change in the first current flow through the first channel region to maintain a constant current flow through the sensor device. The first source region may have a first source resistance and the second source region may have a second source resistance. The second source resistance may be higher than the first source resistance.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

As used herein, the term "connected," when used to refer to two physical elements, means a direct connection between the two physical elements. The term "coupled," however, can mean a direct connection or a connection through one or more intermediary elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Figure 2A:
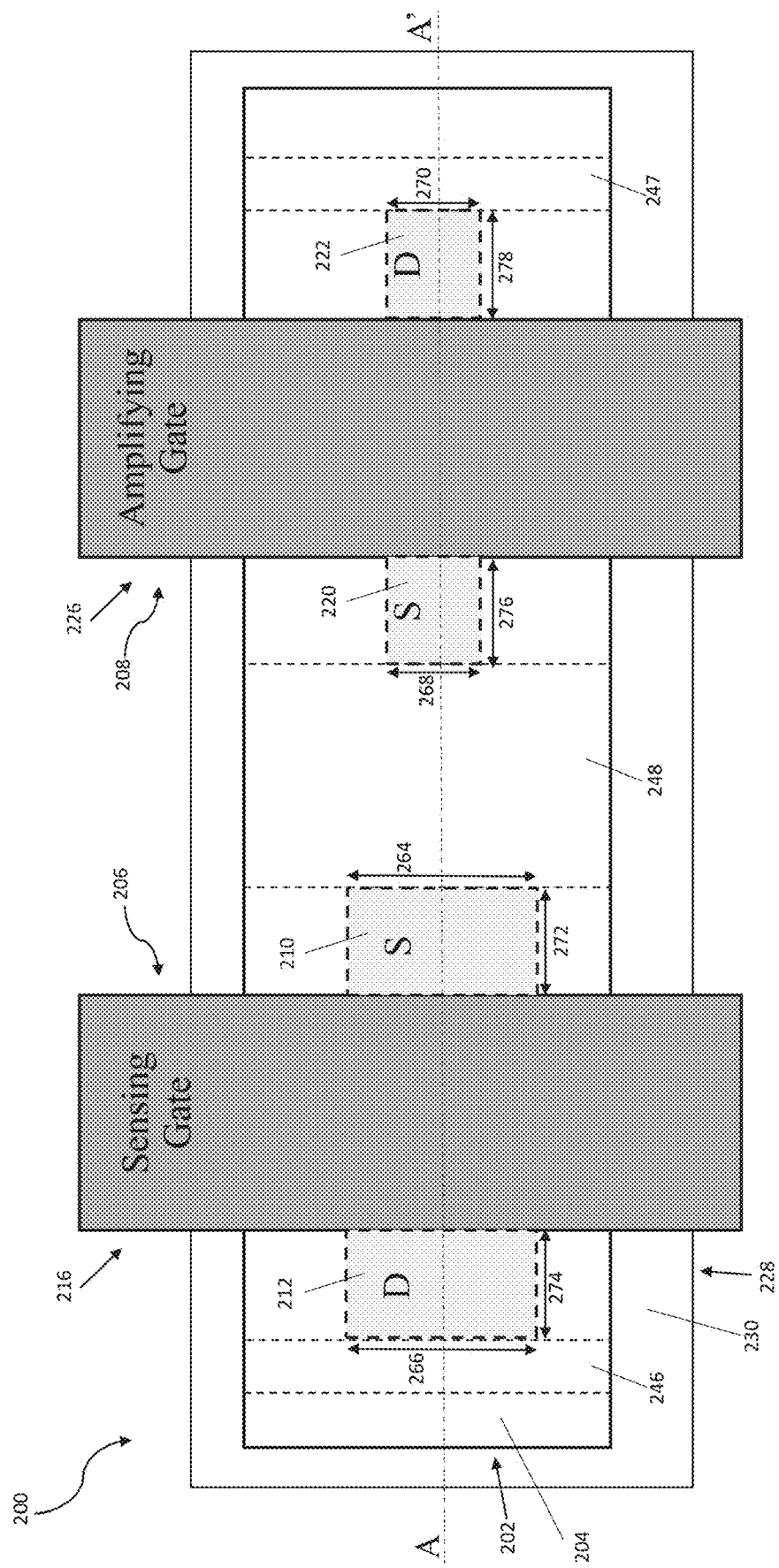
FIG. 2A, FIG. 2B and FIG. 2C respectively show a top view, a top view of an active layer and a cross-sectional view of a sensor device according to a non-limiting embodiment of the present invention.
Figure 2B:
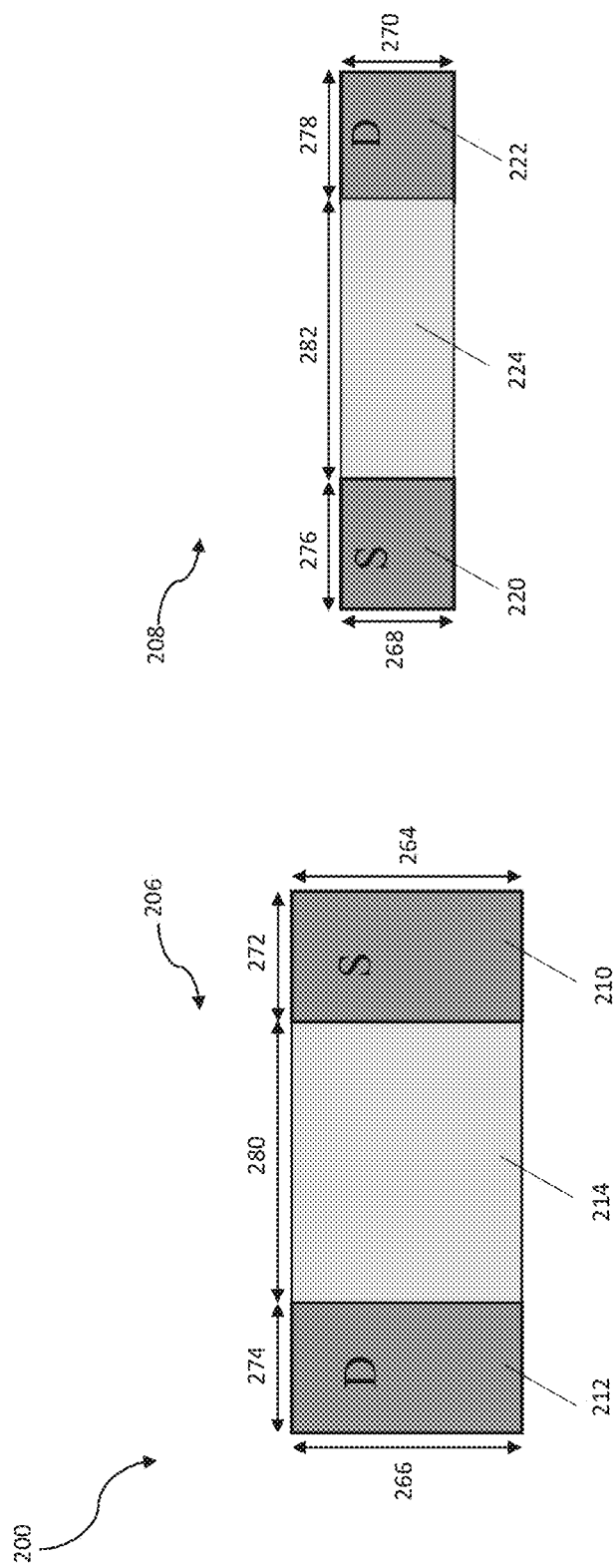
Figure 2C:
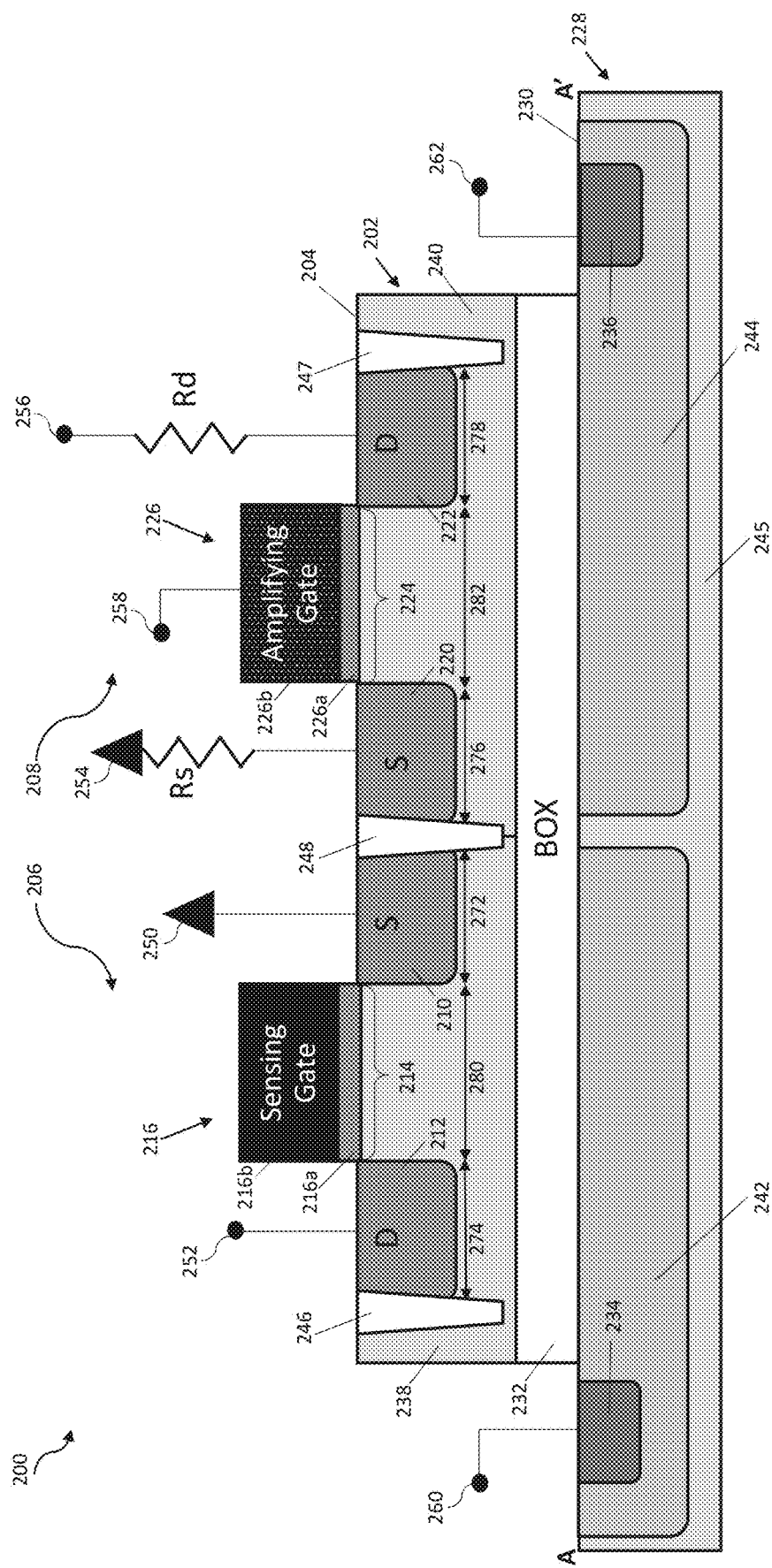

FIG. 2A shows a top view of a sensor device 200 for converting biochemical reactions into electrical signals (for example, for detecting a pH change in a solution caused by biochemical reactions by converting the pH change into electrical signals) according to a non-limiting embodiment of the present invention. The sensor device 200 may be referred to as a multi-gate ion-sensitive field effect transistor (ISFET) sensor in a non-limiting embodiment. FIG. 2B shows a top view of an active layer/component layer of the sensor device 200, and FIG. 2C shows a cross-sectional view of the sensor device 200 along the line A-A'.

The sensor device 200 may include a substrate 202 disposed beneath a surface 204 of the sensor device 200. The substrate 202 may include a first well 238 and a second well 240. In a non-limiting embodiment, the substrate 202 may include any silicon-containing substrate including, but not limited to, silicon (Si), single crystal silicon, polycrystalline Si, amorphous Si, silicon-on-nothing (SON), silicon-on-insulator (SOI) or silicon-on-replacement insulator (SRI), silicon germanium substrates, or combinations thereof, and the like. Substrate 202 may in addition or instead include various isolations, dopings, and/or device features. The substrate 202 may include other suitable elementary semiconductors, such as, for example, germanium (Ge) in crystal, a compound semiconductor, such as silicon carbide (SiC), gallium arsenide (GaAs), gallium phosphide (GaP), indium phosphide (InP), indium arsenide (InAs), indium antimonide (InSb), or combinations thereof; an alloy semiconductor including GaAsP, AlInAs, GaInAs, GaInP, GaInAsP, silicon germanium (SiGe), germanium tin (GeSn), silicon germanium tin (SiGeSn) or combinations thereof. Other types of materials as known to those skilled in the art may also be useful for forming the substrate 202.

The sensor device 200 may further include a first semiconductor structure 206. The first semiconductor structure 206 may include a first source region 210 having a first source resistance, a first drain region 212 having a first drain resistance, and a first channel region 214 beneath the surface 204 of the sensor device 200. The first source region 210 and the first drain region 212 may be at least partially disposed within the substrate 202, for example, within the first well 238. The first channel region 214 may be a portion of the substrate 202 and may be between the first source region 210 and the first drain region 212. The first semiconductor structure 206 may further include a first gate structure 216 disposed over the first channel region 214. In a non-limiting embodiment, the first gate structure 216 may be configured to receive a solution, and a change in pH in the solution may cause a change in a first current flow through the first channel region 214. The first gate structure 216 may be in the form of an open-gate structure in a non-limiting example. For example, the first gate structure 216 may include a cavity (not shown in the figures) configured to receive a solution, a gate oxide layer 216a and a sensing element 216b disposed above the gate oxide layer 216a and within the cavity, so that a change in pH in the solution changes a voltage applied to the first gate structure 216, e.g. the sensing element 216b, which in turn changes a first current flow through the first channel region 214. The gate oxide layer 216a may be formed of any gate oxide material known in the art, such as high-k dielectrics or silicon dioxide in a non-limiting example. The sensing element 216b may include a sensing membrane or a stack of sensing membranes (which may be formed of for example silicon oxide, silicon nitride, aluminium oxide, combinations thereof, or other material(s) as known to those skilled in the art). The first gate structure 216 may alternatively be in the form of a floating-gate structure including a cavity for receiving the solution, an intermediate layer, for example, a passivation layer beneath the cavity to detect changes in the amount and/or type of ions of the solution, and a sensing element disposed beneath the passivation layer. Other types of structures as known to those skilled in the art may also be useful for forming the first gate structure 216.

The sensor device 200 may further include a second semiconductor structure 208. The second semiconductor structure 208 may include a second source region 220 having a second source resistance, a second drain region 222 having a second drain resistance, and a second channel region 224 beneath the surface 204 of the substrate 202. The second source region 220 and the second drain region 222 may be at least partially disposed within the substrate 202, for example within the second well 240. The second channel region 224 may be a portion of the substrate 202 and may be disposed between the second source region 220 and the second drain region 222. The second semiconductor structure 208 may include a second gate structure 226 disposed over the second channel region 224. In one example, the second gate structure 226 may include a gate oxide layer 226a and a gate element 226b. The gate oxide layer 226a may be formed of any gate oxide material known in the art, such as high-k dielectrics or silicon dioxide in a non-limiting example. The gate element 226b may be formed of a conductive material, such as polysilicon (which may be doped or undoped) in a non-limiting embodiment, but other conductive materials, such as metals or alloys for example TiN, TaN, W, and combinations thereof would be recognized by those skilled in the art. The materials used for forming the first gate structure 216 may be the same or may be different from those used for forming the second gate structure 226. The work functions of the first and second gate structures 216, 226 may be the same or may be different.

In a non-limiting embodiment, the first and second semiconductor structures 206, 208 may be similar in structure, for example, they may both be in the form of planar transistors. In a non-limiting example, the first semiconductor structure 206 may be in the form of a sensing transistor and the second semiconductor structure 208 may be in the form of an amplifying transistor. In this non-limiting example, the first gate structure 216 may be referred to as a sensing gate and the second gate structure 226 may be referred to as an amplifying gate. In a non-limiting embodiment, the first and second wells 238, 240 may be used to tune the threshold voltage (Vt) of the first and second semiconductor structures 206, 208 respectively. For example, the first and second wells 238, 240 may be configured to receive first and second well bias voltages to tune the threshold voltage (Vt) of the first and second semiconductor structures 206, 208 respectively.

A first device isolation region 246, a second device isolation region 247 and an internal isolation region 248 may be disposed within the substrate 202. For example, the first device isolation region 246 may be disposed within the substrate 202 such that the first drain region 212 is disposed between the first device isolation region 246 and the first channel region 214. For example, the second device isolation region 247 may be disposed within the substrate 202 such that the second drain region 222 is disposed between the second device isolation region 247 and the second channel region 224. The first device isolation region 246 and the second device isolation region 247 may each be spaced apart from respective sides of the substrate 202 in a non-limiting example, and may serve to isolate the sensor device 200 from external interference, such as interference from neighbouring devices. In a non-limiting example, the internal isolation region 248 may be disposed between the first source region 210 and the second source region 220, and may serve to isolate the first source region 210 from the second source region 220. The internal isolation region 248 may optionally extend deeper into the substrate 202 between the first well 238 and the second well 240. In a non-limiting embodiment, the internal isolation region 248 may serve to partially isolate the first well 238 from the second well 240 by extending between the first well 238 and the second well 240 such that the first well 238 and the second well 240 remain at least partially in contact with each other. Said differently, the internal isolation region 248 may extend across only part of the heights of the first well 238 and the second well 240. In an alternative non-limiting example, the internal isolation region 248 may serve to fully isolate the first well 238 from the second well 240 by extending between the first well 238 and the second well 240, such that the first well 238 and the second well 240 do not contact each other. Said differently, the internal isolation region 248 may extend across the entire heights of the first well 238 and the second well 240. Referring to FIG. 2C, in a non-limiting example, each isolation region 246, 247, 248 may taper towards the bottom of the substrate 202. The first device isolation region 246, second device isolation region 247, and internal isolation region 248 may be in the form of shallow trench isolation (STI) regions. Each isolation region 246, 247, 248 may include an isolation material, such as but not limited to, a gap fill oxide or nitride, or a combination of both. Each isolation region 246, 247, 248 may have a width ranging from about 0.05 um to about 10 um in a non-limiting embodiment, but the width of each isolation region 246, 247, 248 is not limited to this range.

The sensor device 200 may be built on a silicon-on-insulator (SOI) structure. For example, a further substrate 228 having a surface 230 may be arranged below the substrate 202 in a non-limiting embodiment. An oxide layer 232, which may be in the form of a buried oxide layer (BOX) in a non-limiting example, may be arranged between the substrate 202 and the further substrate 228. In a non-limiting embodiment, the further substrate 228 may include any silicon-containing substrate including, but not limited to, silicon (Si), single crystal silicon, polycrystalline Si, amorphous Si, silicon-on-nothing (SON), silicon-on-insulator (SOI) or silicon-on-replacement insulator (SRI), silicon germanium substrates, or combinations thereof, and the like. The further substrate 228 may in addition or instead include various isolations, dopings, and/or device features. The further substrate 228 may include other suitable elementary semiconductors, such as, for example, germanium (Ge) in crystal, a compound semiconductor, such as silicon carbide (SiC), gallium arsenide (GaAs), gallium phosphide (GaP), indium phosphide (InP), indium arsenide (InAs), indium antimonide (InSb), or combinations thereof; an alloy semiconductor including GaAsP, AlInAs, GaInAs, GaInP, GaInAsP, silicon germanium (SiGe), germanium tin (GeSn), silicon germanium tin (SiGeSn), or combinations thereof. Other types of materials as known to those skilled in the art may also be useful for forming the further substrate 228.

The further substrate 228 may include a first conductivity region 242, a second conductivity region 244, and a third conductivity region 245 in a non-limiting embodiment. The first and second conductivity regions 242, 244 may be disposed directly beneath the surface 230 of the further substrate 228. In one non-limiting example, the first conductivity region 242 may be in the form of a first elongate region extending across and beneath the surface 230 of the further substrate 228, and the second conductivity region 244 may be in the form of a second elongate region extending across and beneath the surface 230 of the further substrate 228. The first and second conductivity regions 242, 244 may be adjacent to each other and spaced apart from each other. The first and second conductivity regions 242, 244 may for example, form part of the substrate 228, and the third conductivity region 245 may form the remaining part of the substrate 228.

In a non-limiting embodiment, the sensor device 200 may include a multi-gate design to allow tuning of the operation of the sensor device 200. For example, the sensor device 200 may further include an optional third gate structure 234 at least partially disposed within the further substrate 228, for example, within the first conductivity region 242, and an optional fourth gate structure 236 at least partially disposed within the further substrate 228, for example, within the second conductivity region 244. The third and fourth gate structures 234, 236 may be referred to as back gates and may serve to tune the operation of the sensor device 200 into a desired operational regime in a non-limiting example. Each of the optional third and optional fourth gate structures 234, 236 may include a gate element which in a non-limiting embodiment, may be formed of a conductive material, such as polysilicon in a non-limiting embodiment, but other conductive materials, such as metals or alloys for example TiN, TaN, W, and combinations thereof as would be recognized by those skilled in the art may also be used.

In a non-limiting embodiment as shown in FIG. 2A, the first and second source regions 210, 220 may be distinct regions, and the first and second drain regions 212, 222 may be distinct regions. However, in an alternative non-limiting embodiment, the first and second source regions 210, 220 may be integrally formed as a single source region, and the first and second drain regions 212, 222 may be integrally formed as a single drain region In a non-limiting embodiment, the sensor device 200 may include source terminals 250, 254, drain terminals 252, 256 and gate terminals 258, 260, 262. For example, as shown in FIG. 2C, a first source terminal 250 may be disposed above the first source region 210, and a second source terminal 254 may be disposed above the second source region 220; a first drain terminal 252 may be disposed above the first drain region 212, and a second drain terminal 256 may be disposed above the second drain region 222; a first gate terminal 258 may be disposed above the second gate structure 226, a second gate terminal 260 may be disposed above the third gate structure 234, and a third gate terminal 262 may be disposed above the fourth gate structure 236. In a non-limiting embodiment, the source terminals 250, 254, drain terminals 252, 256, and gate terminals 258, 260, 262 may be in the form of metal contacts and may serve to electrically couple the respective source and drain regions 210, 220, 212, 222 and gate structures 226, 234, 236 to external components when the sensor device 200 is in use. For example, the second source terminal 254 may be for electrical connection of the second source region 220 to an external voltage supply. In a non-limiting embodiment, the sensor device 200 may further include a resistance element, for example a resistor Rs, between the second source region 220 and the second source terminal 254.

In a non-limiting embodiment, the second source resistance may be higher than the first source resistance. This can degenerate the second semiconductor structure 208, which can in turn improve the sensitivity of the sensor device 200. The second source resistance may be higher than the first source resistance and may range from about 1 kOhm to about 500 kOhms in a non-limiting embodiment. In this non-limiting embodiment, when the second source resistance is higher than the first source resistance, the second drain resistance may be substantially equal to or may be different from (e.g. higher than or lower than) the first drain resistance. In an alternative non-limiting embodiment, the second drain resistance may be higher than the first drain resistance and may range from about 1 kOhm to about 500 kOhms. In this alternative non-limiting embodiment, when the second drain resistance is higher than the first drain resistance, the second source resistance may be substantially equal to or may be different from (e.g. higher than or lower than) the first source resistance.

Each of the first source and drain regions 210, 212, and the second source and drain regions 220, 222 may include one or more dopants. In one non-limiting embodiment, the first source and drain regions 210, 212, and the second source and drain regions 220, 222 have the same doping concentration (i.e. the same concentration of dopants). Alternatively, the doping concentration of the source and drain regions 210, 212, 220, 222 may be different from each other. In a non-limiting example, the second source region 220 may include a lower concentration of dopants as compared to the first source region 210, and the first and second drain regions 212, 222 may include an equal concentration of dopants. In an alternative non-limiting example, the second drain region 222 may include a lower concentration of dopants as compared to the first drain region 212, and the first and second source regions 210, 220 may include a same concentration of dopants. In yet another alternative non-limiting example, the second source region 220 may include a lower concentration of dopants as compared to the first source region 210, and the second drain region 222 may include a lower concentration of dopants as compared to the first drain region 212. The first source region 210 may include a concentration of dopants ranging from $1 \times 10^{19}/cm^3$ to about $5 \times 10^{20}/cm^3$ in a non-limiting embodiment. The second source region 220 may include a concentration of dopants lower than $1 \times 10^{19}/cm^3$, for example ranging from $5 \times 10^{17}/cm^3$ to about $5 \times 10^{18}/cm^3$ in a non-limiting embodiment. The first drain region 212 may include a concentration of dopants ranging from $1 \times 10^{19}/cm^3$ to about $5 \times 10^{20}/cm^3$. The second drain region 222 may include a concentration of dopants lower than $1E19/cm^3$, for example ranging from $5 \times 10^{17}/cm^3$ to about $5 \times 10^{18}/cm^3$ in a non-limiting embodiment.

The substrate 202 may also include one or more dopants. The doping concentrations of the source and drain regions 210, 212, 220, 222 may be higher than the doping concentration of the substrate 202 in a non-limiting embodiment. For example, the doping concentrations of the first source and drain regions 210, 212 may be higher than the doping concentration of the first well 238 of the substrate 202, and the doping concentrations of the second source and drain regions 220, 222 may be higher than the doping concentration of the second well 240 of the substrate 202. The doping concentrations of the first well 238 and the second well 240 may be the same in one non-limiting embodiment or may be different in another non-limiting embodiment. The first well 238 may include a concentration of dopants ranging from $1 \times 10^{14}/cm^3$ to about $1 \times 10^{17}/cm^3$ in a non-limiting embodiment. The second well 240 may include a concentration of dopants ranging from $1 \times 10^{14}/cm^3$ to about $1 \times 10^{17}/cm^3$.

The further substrate 228 may also include one or more dopants. The doping concentrations of the first conductivity region 242 and the second conductivity region 244 may be the same in one non-limiting embodiment or may be different in another non-limiting embodiment. In one non-limiting embodiment, the doping concentrations of the first conductivity region 242, and the second conductivity region 244 may be the same and equal to the doping concentrations of the first well 238 and the second well 240. In an alternative non-limiting embodiment, the doping concentrations of the first well 238, second well 240, first conductivity region 242 and second conductivity region 244 may be different. Further, the doping concentrations of the first conductivity region 242 and the second conductivity region 244 may be the same as the doping concentration of the third conductivity region 245 in a non-limiting embodiment, or may be higher than the doping concentration of the third conductivity region 245 in an alternative non-limiting embodiment. The first conductivity region 242 may include a concentration of dopants ranging from $1 \times 10^{14}/cm^3$ to about $5 \times 10^{17}/cm^3$. The second conductivity region 244 may include a concentration of dopants ranging from $1 \times 10^{14}/cm^3$ to about $5 \times 10^{17}/cm^3$.

The first source region 210 and the first drain region 222 may have a conductivity type that is the same as the second source region 220 and the second drain region 222. For example, the first and second source regions 210, 220, and the first and second drain regions 212, 222 may all have a p-type conductivity, in other words, include dopants having a p-type conductivity (e.g. p-type dopants), or alternatively, may all have an n-type conductivity, in other words, include dopants having an n-type conductivity (e.g. n-type dopants). The first and second source regions 210, 220, and the first and second drain regions 212, 222 may have a conductivity type (p-type or n-type) that is different from the first and second wells 238, 240. In a non-limiting example, the first and second source regions 210, 220, and the first and second drain regions 212, 222 may have a first conductivity type, in other words, include dopants having a first conductivity type when the first well 238 and the second well 240 have a second conductivity type different from the first conductivity type, in other words, include dopants having a second conductivity type. For example, the first and second source regions 210, 220, and the first and second drain regions 212, 222 may have a p-type conductivity when the first well 238 and the second well 240 have an n-type conductivity, or may have an n-type conductivity when the first well 238 and the second well 240 have a p-type conductivity. In a non-limiting embodiment, the first and second semiconductor structures 206, 208 may both include a p-type metal oxide semiconductor (PMOS). In an alternative non-limiting embodiment, the first and second semiconductor structures 206, 208 may both include an n-type metal oxide semiconductor (NMOS).

The first conductivity region 242 and the second conductivity region 244 may have a conductivity type (e.g. p-type or n-type) that is the same as the first well 238 and the second well 240. For example, the first conductivity region 242 and the second conductivity region 244 may have a p-type conductivity when the first well 238 and the second well 240 have a p-type conductivity, or may have an n-type conductivity when the first well 238 and the second well 240 have an n-type conductivity. Alternatively, the first conductivity region 242 and the second conductivity region 244 may have a conductivity type (e.g. p-type or n-type) that is different from the first well 238 and the second well 240. For example, the first conductivity region 242 and the second conductivity region 244 may have a p-type conductivity when the first well 238 and the second well 240 have an n-type conductivity, or may have an n-type conductivity when the first well 238 and the second well 240 have a p-type conductivity. The first conductivity region 242 and the second conductivity region 244 may have a same conductivity type (e.g. p-type or n-type) as the third conductivity region 245. For example, the first, second and third conductivity regions 242, 244, 245 may all have a p-type conductivity or they may all have an n-type conductivity. Alternatively, the first conductivity region 242 and the second conductivity region 244 may have a different conductivity type (e.g. p-type or n-type) from the third conductivity region 245. For example, the first and second conductivity regions 242, 244 may have a p-type conductivity when the third conductivity region 245 has an n-type conductivity or the first and second conductivity regions 242, 244 may have an n-type conductivity when the third conductivity region 245 has a p-type conductivity.

In one non-limiting example, the implant material for the source and drain regions 210, 212, 220, 222, the first and second wells 238, 240 and the first, second and third conductivity regions 242, 244, 245 may be the same implant material (for example, an epitaxial silicon material in a non-limiting embodiment). The p-type material may be or include, but is not limited to epitaxial silicon germanium and/or the n-type material may be or include, but is not limited to doped silicon material comprising n-type dopants. P-type dopants can for example, include but are not limited to boron (B), aluminium (Al), indium (In) or a combination thereof, while n-type dopants can include carbon (C), phosphorus (P), arsenic (As), antimony (Sb) or a combination thereof. Other types of implant materials and dopants as known to those skilled in the art may also be useful for forming the source and drain regions 210, 212, 220, 222, the first and second wells 238, 240 and the first, second and third conductivity regions 242, 244, 245

The source and drain regions 210, 212, 220, 222 may optionally include one or more silicides. In one non-limiting embodiment, the first source region 210 may include more silicides than the second source region 220. For example, the first source region 210 may include one or more silicides and one or more silicides may be absent from the second source region 220. (In a non-limiting example, silicides may be totally absent from the second source region 220.) In this embodiment, one or more silicides may be present or absent from the first and second drain regions 212, 222. In another non-limiting embodiment, the first drain region 212 may include more silicides than the second drain region 222. For example, the first drain region 212 may include one or more silicides and one or more silicides may be absent from the second drain region 222. (In a non-limiting example, silicides may be totally absent from the second drain region 222.) In this embodiment, one or more silicides may be present or absent from the first and second source regions 210, 220. In a non-limiting embodiment, the one or more silicides may include cobalt silicide (CoSi2), nickel silicide (NiSi), titanium silicide (TiSi2), tantalum silicide (TaSi2), platinum silicide (PtSi), palladium silicide (Pd2Si), rhodium silicide (RhSi), or combinations thereof. Other silicides as known to those skilled in the art may also be included.

Referring to FIGS. 2A and 2B, in a non-limiting embodiment, a width of the first channel region 214 may be equal to a width of the second channel region 224. However, the width 280 of the first channel region 214 may be greater or less than the width 282 of the second channel region 224 in other non-limiting embodiments. A width of the first channel region 214 may range from about 0.05 um to about 100 um in a non-limiting embodiment. A length (e.g. maximum length 272) of the first source region 210 may be equal to or may be different from a length (e.g. maximum length 276) of the second source region 220 and a length (e.g. maximum length 274) of the first drain region 212 may be equal to or may be different from a length (e.g. maximum length 278) of the second drain region 222. Referring to FIG. 2A and FIG. 2B, in a non-limiting embodiment, a width 268 of the second source region 220 may be less than a width 264 of the first source region 210. For example, a width 268 of the second source region 220 compared to a width 264 of the first source region 210 may have a ratio ranging from 1:1 to 1:1000. In a non-limiting embodiment, a width 270 of the second drain region 222 may be less than a width 266 of the first drain region 212. For example, a width 270 of the second drain region 222 compared to a width 266 of the first drain region 212 may have a ratio ranging from 1:1 to 1:1000. In this document, a length of a region is defined as a dimension of the region along a direction of the current flows through the sensor device 200, whereas a width of a region is defined as a dimension of the region along a direction perpendicular to the current flows through the sensor device 200.

Figure 3:
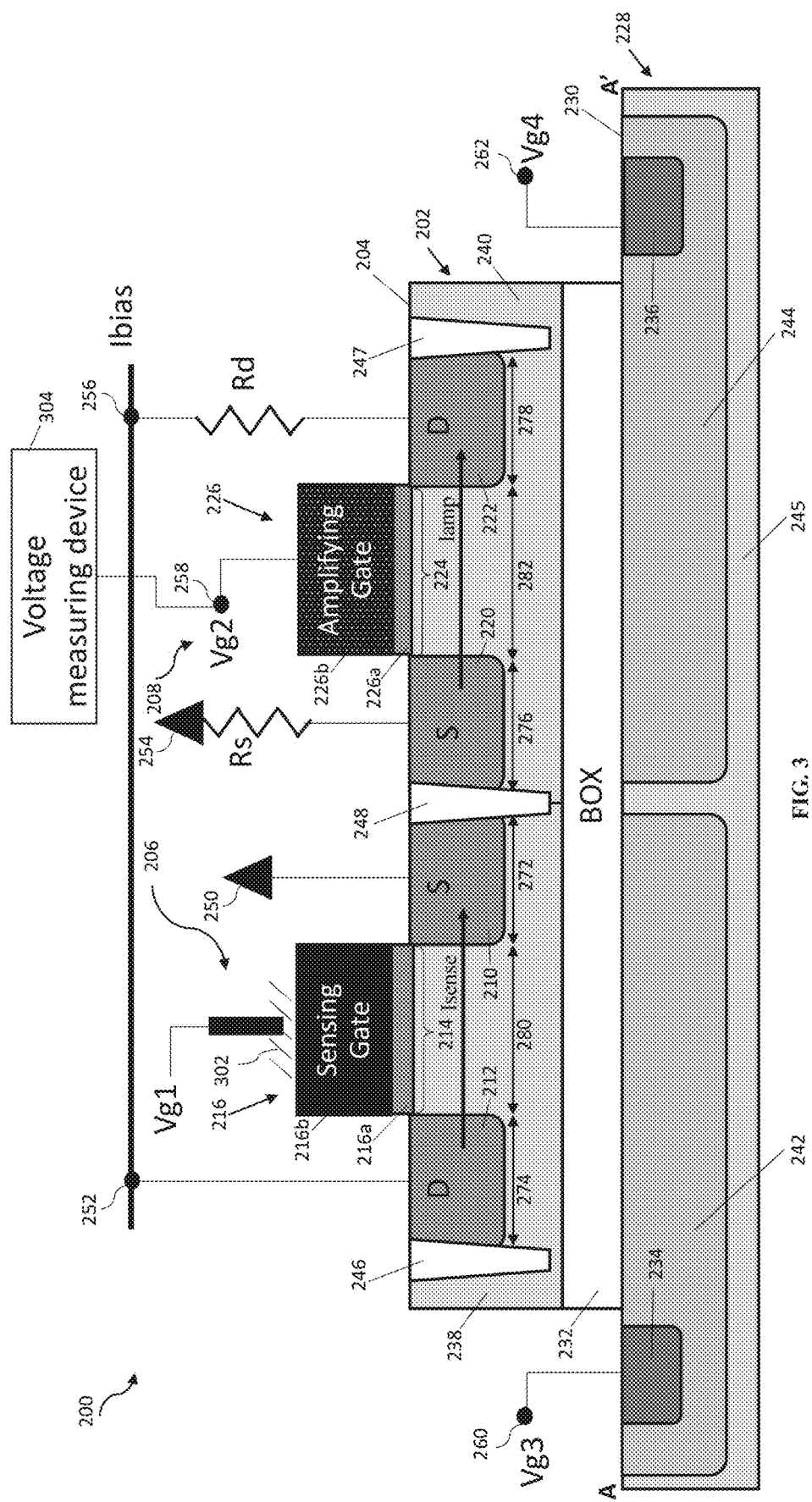
FIG. 3 shows the sensor device of FIGS. 2A-2C in use.
Figure 4:
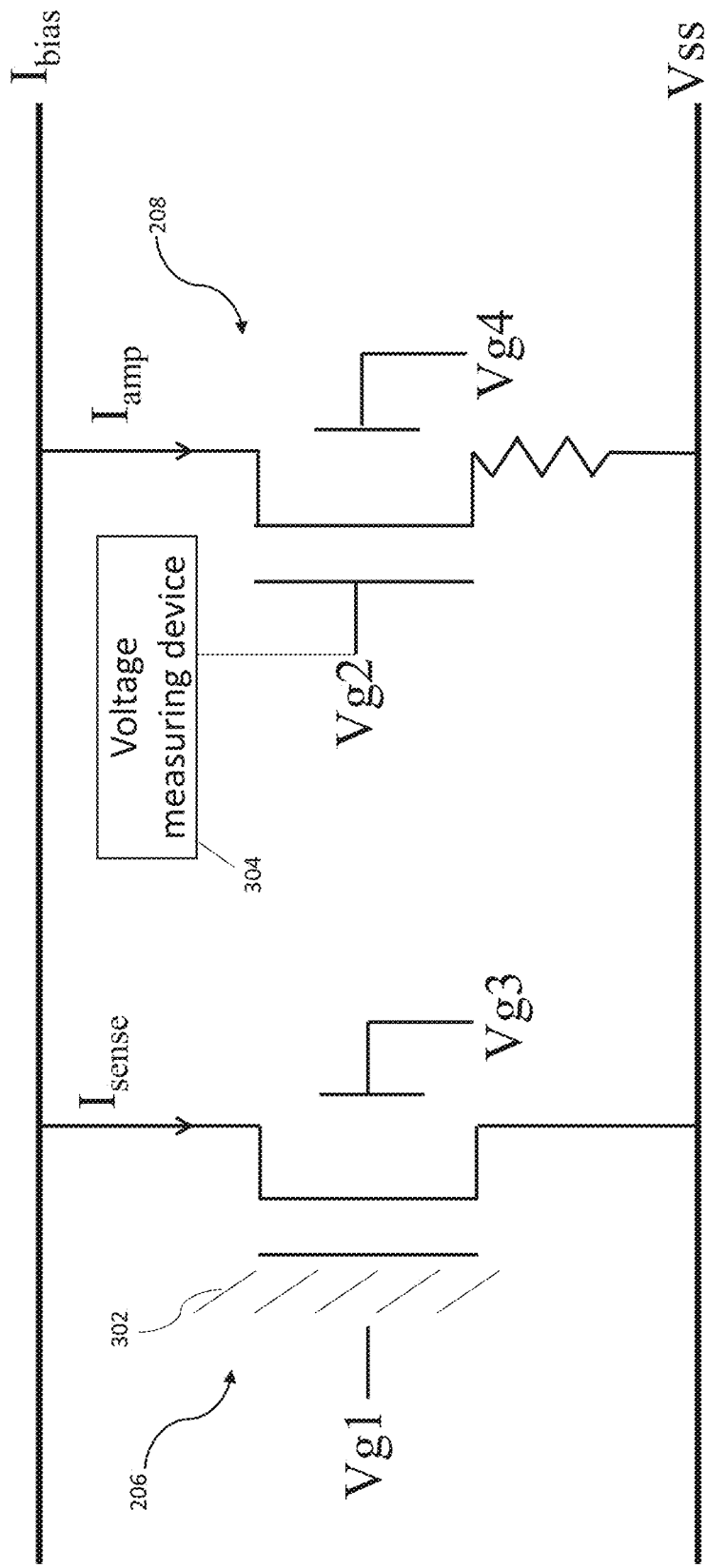
FIG. 4 shows an equivalent circuit of the sensor device of FIGS. 2A-2C when the sensor device is in use.

FIG. 3 shows the sensor device 200 in use, and FIG. 4 shows an equivalent circuit of the sensor device 200 in use. In use, the first and second source regions 210, 220 may be coupled to an external voltage supply Vss and hence, biased at the voltage Vss; whereas, the first and second drain regions 212, 222 may be coupled to an external current source configured to provide a current flow $I_{bias}$ through the sensor device 200. The first gate structure 216 of the first semiconductor structure 206 may be contacted with a solution 302. For example, the sensing element 216b may be contacted with the solution 302, so that a change in pH in the solution 302 may cause a change in a voltage applied to the first gate structure 216 e.g. the sensing element 216b.

Referring to FIG. 3 and FIG. 4, the current flow $I_{bias}$ provided by the external current source may split into a first current flow $I_{sense}$ through the first semiconductor structure 206, for example, through the first channel region 214 (FIG. 3) and a second current flow $I_{amp}$ through the second semiconductor structure 208, for example, through the second channel region 224 (FIG. 3). In other words, the current flow $I_{bias}$ passing through the sensor device 200 may be a combination of the first current flow $I_{sense}$ and the second current flow $I_{amp}$ in a non-limiting embodiment as described in Equation (1).

$$I_{sense} + I_{amp} = I_{bias} = \text{constant} \quad (1)$$

Figure 5:
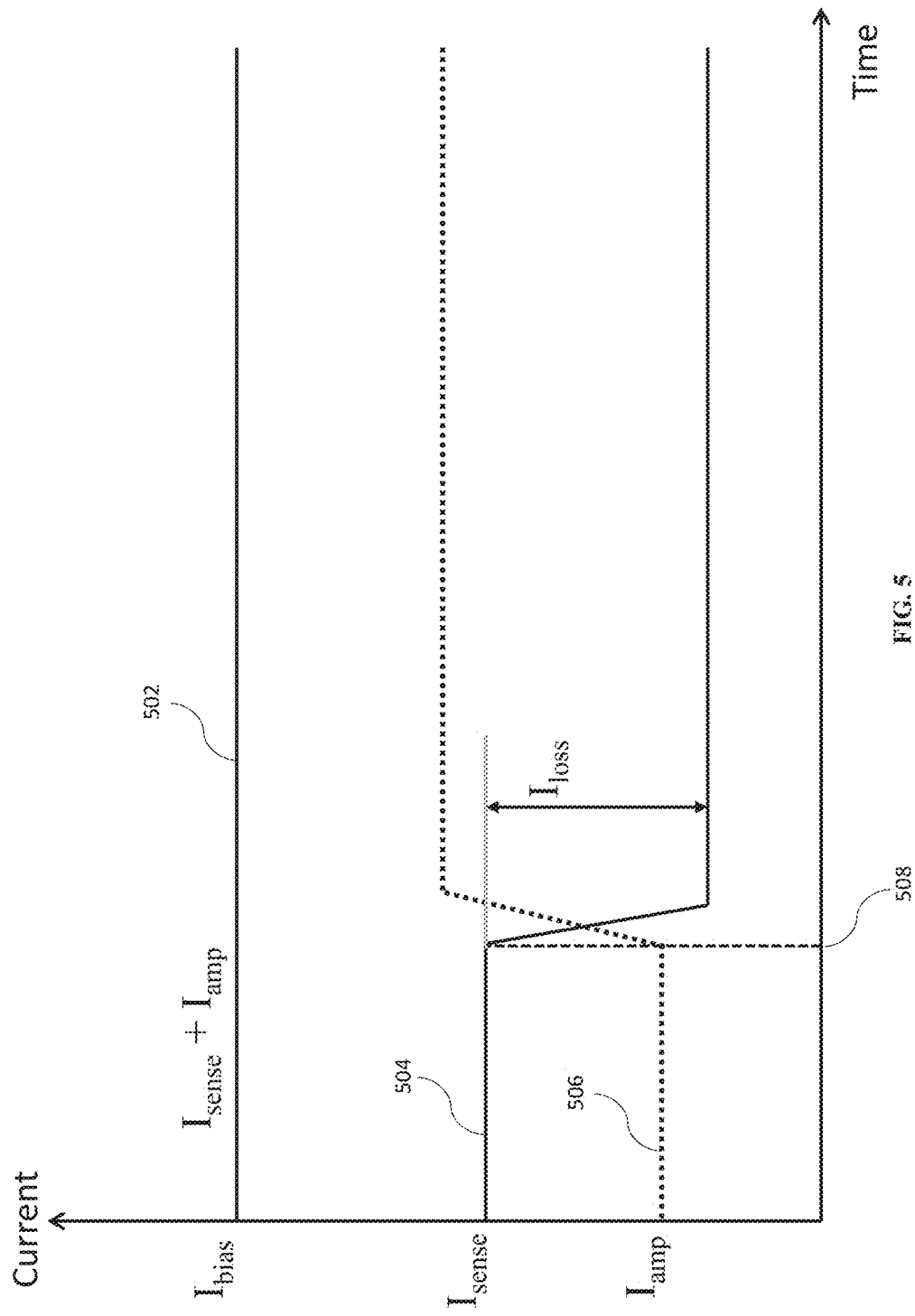
FIG. 5 shows plots of current flows through the sensor device of FIGS. 2A-2C when the sensor device is in use.

FIG. 5 shows plots 502, 504, 506 of the currents $I_{bias}$, $I_{sense}$ and $I_{amp}$ respectively through the sensor device 200. By coupling the first and second drain regions 212, 222 to the external current source, the sensor device 200 may operate to maintain the current flow $I_{bias}$ constant through the sensor device 200 as shown in plot 502 in FIG. 5. In other words, the sensor device 200 may compensate for a change in the first current flow $I_{sense}$ with a change in the second current flow $I_{amp}$, since the current flow $I_{bias}$ passing through the sensor device 200 is a combination of the first and second current flows $I_{bias}$, $I_{amp}$. For example, the magnitude of the change in the second current flow $I_{amp}$ through the second channel region 224 may be equal to the magnitude of the change in the first current flow $I_{bias}$ through the first channel region 214 as shown in Equations (2)-(3) below.

$$\Delta I_{sense} - \Delta I_{amp} = 0 \quad (2)$$

$$|\Delta I_{sense}| = |\Delta I_{amp}| \quad (3)$$

In a non-limiting embodiment, a change in pH in the solution 302 may cause a change in the first current flow $I_{sense}$ through the first channel region 214. For example, the change in pH in the solution 302 may cause a change in a voltage Vg1 applied to the first gate structure 216 which may in turn cause a change in the first current flow $I_{sense}$ through the first channel region 214. The sensor device 200 may be configured such that when the first current flow $I_{sense}$ through the first channel region 214 changes due to the change in pH in the solution 302, the second current flow $I_{amp}$ through the second channel region 224 changes to compensate for the change in the first current flow $I_{sense}$ through the first channel region 214 to maintain a constant current flow $I_{bias}$ through the sensor device 200. For example, to keep the current flow $I_{bias}$ through the sensor device 200 constant, the sensor device 200 may operate to change the second current flow $I_{amp}$ through the second channel region 224. This may in turn cause a change in a gate voltage Vg2 at the second gate structure 226. The change in the gate voltage Vg2 at the second gate structure 226 may then be measured by a voltage measuring device 304 to determine the change in pH in the solution 302. In a non-limiting example as shown in FIG. 5, a change in pH in the solution 302 at a time 508 may cause a change in the voltage Vg1 applied to the first gate structure 216, which may in turn cause the first current flow $I_{sense}$ to drop by an amount $I_{loss}$ (as shown by plot 504). The second current flow $I_{amp}$ through the second channel region 224 may then increase by the same amount $I_{loss}$ (as shown by plot 506) to compensate for the change in the first current flow $I_{sense}$ to maintain the constant current flow $I_{bias}$ (as shown by plot 502) through the sensor device 200.

In a non-limiting embodiment, the third gate structure 234 may be configured to receive a first bias voltage Vg3 to affect the first current flow $I_{sense}$ through the first channel region 214. In a non-limiting embodiment, the fourth gate structure 236 may be configured to receive a second bias voltage Vg4 to affect the second current flow $I_{amp}$ through the second channel region 224. The first and second bias voltages Vg3, Vg4 may be referred to as backgate bias voltages, and may be the same in a non-limiting embodiment or different in another non-limiting embodiment. In a non-limiting example, the operation of the first semiconductor structure 206 may be tuned by adjusting the first bias voltage Vg3 received by the third gate structure 234. For example, the operation of the first semiconductor structure 206 may be tuned to increase the amount of change in the first current flow $I_{sense}$ through the first channel region 214 in response to a same amount of change in the voltage Vg1 applied to the first gate structure 216. In a non-limiting example, the operation of the second semiconductor structure 208 may be tuned by adjusting the second bias voltage Vg4 received by the fourth gate structure 236. For example, the operation of the second semiconductor structure 208 may be tuned to increase the amount of change in the voltage Vg2 at the second gate structure 226 in response to a same amount of change in the second current flow $I_{amp}$ through the second channel region 224.

Figure 6:
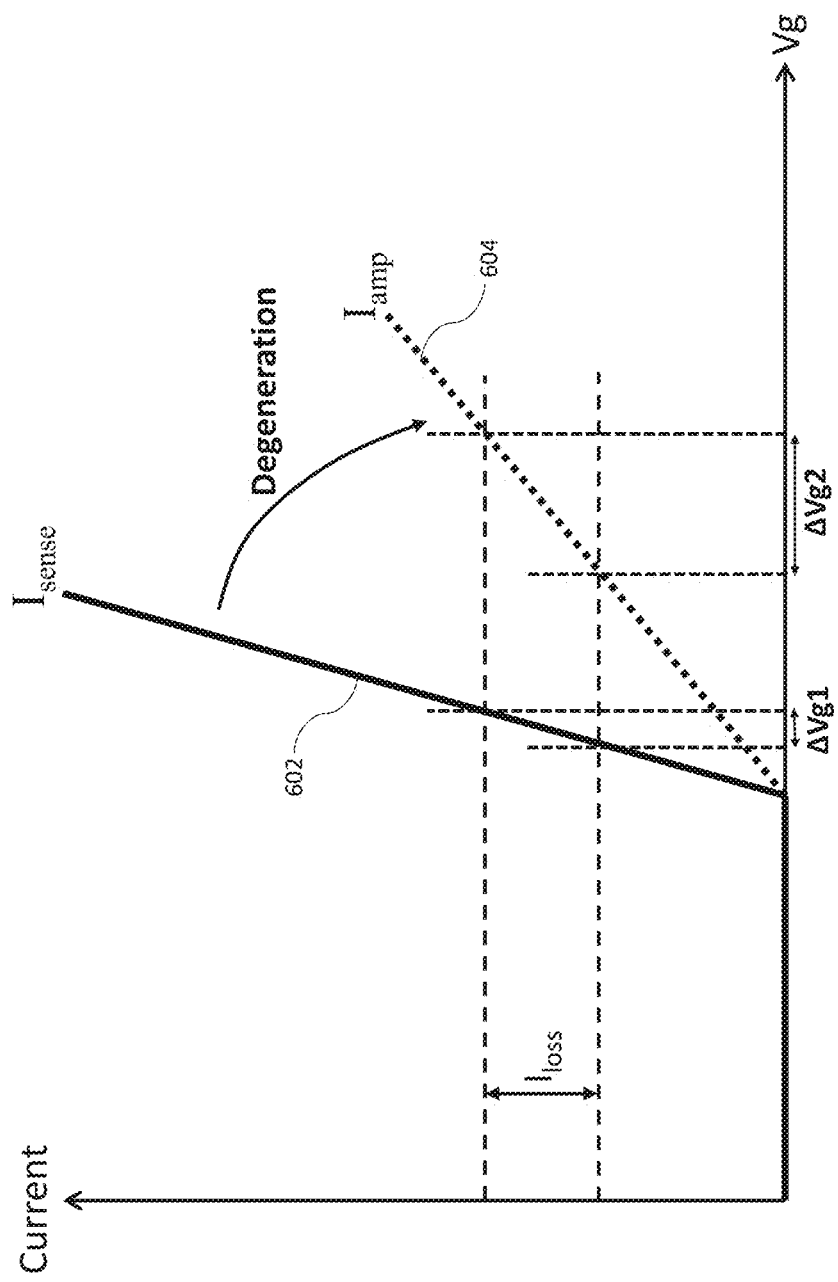
FIG. 6 shows plots of current flows through the sensor device of FIGS. 2A-2C.

Referring to FIG. 6, a higher second source resistance may allow a change in the second current flow $I_{amp}$ through the second channel region 224 to cause a greater change in the voltage Vg2 at the second gate structure 226, hence increasing the sensitivity of the sensor device 200 in a non-limiting example. FIG. 6 shows plots 602, 604 of the first current flow $I_{sense}$ and the second current flow $I_{amp}$ respectively through the sensor device 200 in the absence of the first and second bias voltages Vg3 and Vg4. As shown in FIG. 6, the degeneration of the sensor device 200 by for example, configuring the second source resistance to be higher than the first source resistance may improve the sensitivity of the sensor device 200. In a non-limiting example, as shown in FIG. 6, a change in Vg1 (ΔVg1) may cause $I_{sense}$ to change by an amount $I_{loss}$ and to compensate for this change, $I_{amp}$ may change by an amount $I_{loss}$, which may in turn change Vg2. Referring to FIG. 6, it can be seen that degeneration of the sensor device 200 may cause the change in Vg2 (ΔVg2) to be greater than the change in Vg1 (ΔVg1), hence increasing the sensitivity/amplifying factor ΔVg2/ΔVg1 of the sensor device 200.

Figure 8:
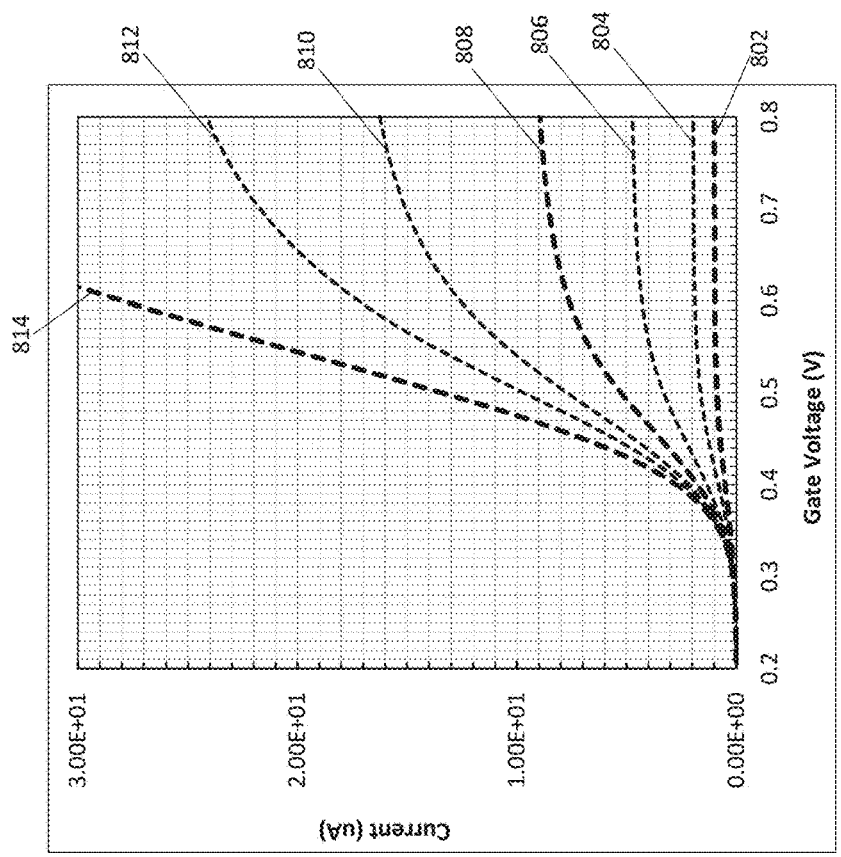
FIG. 8 shows plots of current flows through the sensor device of FIGS. 2A-2C for seven different source resistances of a second semiconductor structure in the sensor device with the sensor device simulated using a SPICE (simulation program with integrated circuit emphasis) model.
Figure 7:
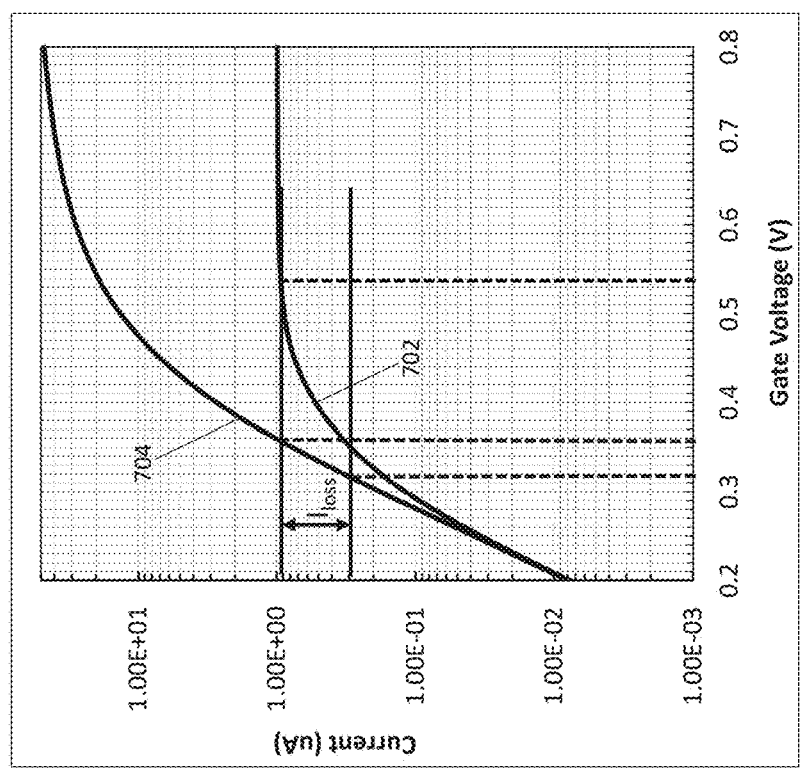
FIG. 7 shows plots of current flows through the sensor device of FIGS. 2A-2C for two different source resistances of a second semiconductor structure in the sensor device with the sensor device simulated using a SPICE (simulation program with integrated circuit emphasis) model.

FIG. 7 shows plots 702, 704 of the second current flow $I_{amp}$ through the sensor device 200 when the second source resistance is 100 kOhms and 1 kOhm respectively. The plots 702, 704 of FIG. 7 are obtained by simulating the sensor device 200 using a SPICE (simulation program with integrated circuit emphasis) model. As shown in FIG. 7, with a higher second source resistance, the change in Vg2 for a same amount of change in $I_{amp}$ may be larger. In a non-limiting example as shown in FIG. 7, when the second current flow $I_{amp}$ of the sensor device 200 with the second source resistance equal to 1 kOhm changes by an amount $I_{loss}$=0.65 uA, the change in Vg2 is about 35 mV (see plot 704), whereas when the second current flow $I_{amp}$ of the sensor device 200 with the second source resistance equal to 100 kOhms changes by an amount $I_{loss}$=0.65 uA, the change in Vg2 is about 210 mV. In other words, the change in Vg2 is about 6 times higher in the sensor device 200 with the second source resistance equal to 100 kOhms as compared to the sensor device 200 with the second source resistance equal to 1 kOhm. Said differently, the sensitivity of the sensor device 200 with the second source resistance equal to 100 kOhms is 6 times higher than the sensitivity of the sensor device 200 with the second source resistance equal to 1 kOhm. FIG. 8 shows plots 802, 804, 806, 808, 810, 812, 814 of the second current flow $I_{amp}$ through the sensor device 200 when the second source resistance is 100 kOhms, 50 kOhms, 20 kOhms, 10 kOhms, 5 kOhms, 3 kOhms and 1 kOhm respectively. The plots 802, 804, 806, 808, 810, 812, 814 are obtained by simulating the sensor device 200 using a SPICE model. Similarly, as shown in FIG. 8, with a higher second source resistance, the change in Vg2 for a same amount of change in $I_{amp}$ may be larger.

The sensitivity/amplifying factor ΔVg2/ΔVg1 of the sensor device 200 may depend on the ratio of the transconductance of the first semiconductor structure 206 to the transconductance of the second semiconductor structure 208 (Gm1/Gm2) in a non-limiting embodiment. The ratio Gm1/Gm2 may in turn be determined by for example the value of the resistor Rs between the second source region 220 and the second source terminal 254. In a non-limiting example, the transconductance of the second semiconductor structure 208 may be affected by the resistor Rs between the second source region 220 and the second source terminal 254 based on Equation (4) below where Gm represents the transconductance of the second semiconductor structure 208 in the absence of the resistor Rs and Gm' represents the transconductance of the second semiconductor structure 208 with the resistor Rs between the second source region 220 and the second source terminal 254.

$$Gm' \approx Gm\left(\frac{1}{1 + GmRs}\right) \quad (4)$$

In a non-limiting example, assuming that the first and second semiconductor structures 206, 208 have the same transconductance 400 uS in the absence of Rs, if a resistor Rs having a resistance value of 37.5 kOhms is included between the second source region 220 and the second source terminal 254, the transconductance of the second semiconductor structure 208 may decrease to about 40 uS (as calculated based on Equation (4)). In this non-limiting example, the sensitivity/amplifying factor of the sensor device 200 may be ΔVg2/ΔVg1=Gm1/Gm2 which is about 400 uS/40 uS=10. Therefore, ΔVg2=10*ΔVg1. Said differently, if a change in pH in the solution 302 causes a change in Vg1 (ΔVg1), which in turn causes the first current flow $I_{sense}$ to change by an amount $I_{loss}$, then when the second current flow $I_{amp}$ changes by the same amount $I_{loss}$, the change in Vg2 (ΔVg2) may be amplified by 10 times as compared to the change in Vg1 (ΔVg1).

Figure 9:
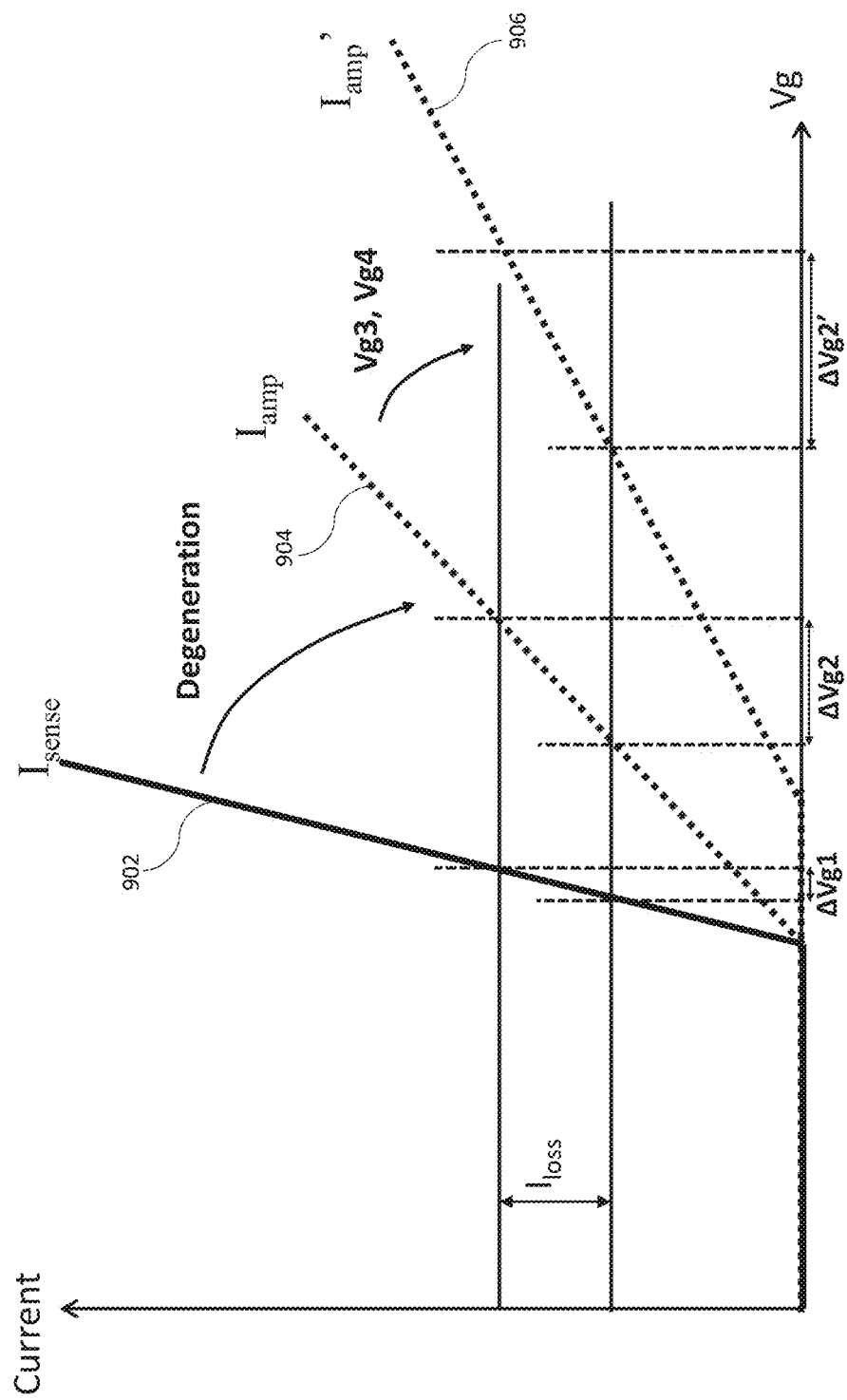
FIG. 9 shows plots of current flows through the sensor device of FIGS. 2A-2C in the absence and presence of backgate bias voltages.

The transconductances of the first and second semiconductor structures 206, 208 may be adjusted by adjusting the first and second bias voltages Vg3, Vg4 received by the third and fourth gate structures 234, 236 respectively in a non-limiting embodiment. In a non-limiting example, the ratio Gm1/Gm2 may be determined by the first and second bias voltages Vg3, Vg4 received by the third and fourth gate structures 234, 236 respectively. FIG. 9 shows a plot 902 of the first current flow $I_{sense}$ through the sensor device 200 and plots 904, 906 of the second current flow $I_{amp}$, $I_{amp}'$ in the absence and presence of the backgate bias voltages respectively. As shown in FIG. 9, biasing the third and fourth gate structures 234, 236 at Vg3 and Vg4 respectively may increase the change in Vg2 (ΔVg2') for a same amount of change in $I_{amp}'$ (as compared to the change in Vg2 (ΔVg2) for a same amount of change in $I_{amp}$), hence increasing the sensitivity of the sensor device 200 in a non-limiting example.

In a non-limiting embodiment, the starting substrate may be a SOI substrate including the substrate 202, the oxide layer 232 and the further substrate 228. The SOI substrate may be formed by any method known to those skilled in the art. In another non-limiting embodiment, the starting substrate may include the further substrate 228 which may be a semiconductor wafer. The oxide layer 232 may be disposed over the surface 230 of the further substrate 228 and the substrate 202 may then be disposed over the oxide layer 232. In a non-limiting embodiment, the sensor device 200 may be formed by first forming or obtaining the further substrate 228 (either alone in a non-limiting embodiment or as part of a SOI substrate in an alternative non-limiting embodiment) and then disposing the first and second conductivity regions 242, 244 in the further substrate 228. The third and fourth gate structures 234, 236 may then be at least partially disposed in the further substrate 228, for example, the third gate structure 234 may be at least partially disposed in the first conductivity region 242, and the fourth gate structure 236 may be at least partially disposed in the second conductivity region 244. In a non-limiting example, the third and fourth gate structures 234, 236 may be disposed in the further substrate 228 by an implantation process, but any other process as known to those skilled in the art may also be used. The first and second semiconductor structures 206, 208 may then be formed on the substrate 202. Forming the first semiconductor structure 206 may include disposing the first source region 210 at least partially within the substrate 202, disposing the first drain region 212 at least partially within the substrate 202, disposing the first channel region 214 between the first source region 210 and the first drain region 212, and disposing the first gate structure 216 over the first channel region 214. Forming the second semiconductor structure 208 may include disposing the second source region 220 at least partially within the substrate 202, disposing the second drain region 222 at least partially within the substrate 202, disposing the second channel region 224 between the second source region 220 and the second drain region 222 and disposing the second gate structure 226 over the second channel region 224. In a non-limiting embodiment, the first channel region 214 may be formed before forming the first source and drain regions 210, 212 of the first semiconductor structure 206, and the second channel region 224 may be formed before forming the second source and drain regions 220, 222 of the second semiconductor structure 208. In another non-limiting embodiment, the first channel region 214 may be formed after forming the first source and drain regions 210, 212 of the first semiconductor structure 206, and the second channel region 224 may be formed after forming the second source and drain regions 220, 222 of the second semiconductor structure 208. The above described order of the steps for the method is only intended to be illustrative, and the steps of the method of the present invention are not limited to the above specifically described order unless otherwise specifically stated.

The first semiconductor structure 206 may be formed using, for example, known processes and techniques. For example, a dummy poly or dielectric may first be formed on an area of the substrate 202. Then the first source and drain regions 210, 212 may be formed. In various embodiments, one or more of a spacer, silicide, inter-layer dielectric (ILD), metal contacts, metal layers, passivation layer, or combinations thereof may be formed after forming the dummy poly. In various embodiments, a cavity may then be formed by removing the dummy poly. The sensing element 216b may include a sensing membrane or a stack of sensing membranes and may be formed in the cavity 216. Other ways of forming the first semiconductor structure 206 as known to those skilled in the art may also be useful. The second semiconductor structure 208 may also be formed using, for example, known processes and techniques. For example, the gate element 226b may be formed using known processes and techniques such as forming polysilicon and a gate resist pattern and then performing gate etching. In a non-limiting example, the second semiconductor structure 208 may include spacer elements alongside the gate element 226b. In this non-limiting example, a layer of dielectric material (which may be any oxide material known in the art, for example, silicon oxide, silicon nitride or silicon oxynitride) may be deposited over the gate element 226b and then etched to form spacer elements alongside the gate element 226b. The source terminals 250, 254, drain terminals 252, 256, and gate terminals 258, 260, 262 may be formed and may be coupled with other interconnect wires or contacts using a back end of line (BEOL) process or any other process as known to those skilled in the art.

As mentioned above, the source and drain regions 210, 212, 220, 222 may optionally include one or more silicides. In a non-limiting embodiment, a source region 210/220 or a drain region 212/222 including one or more silicides may be formed by for example, depositing a metal over a region of the silicon substrate 202 where the source region 210/220 or drain region 212/222 is to be disposed and providing energy (e.g. by thermal heating, laser irradiation or ion beam mixing) to the metal-silicon interface between the deposited metal and the region of the silicon substrate 202. Providing the energy to the metal-silicon interface may cause the metal to react with the silicon substrate 202 to form silicide; therefore, the resulting source region 210/220 or drain region 212/222 may include one or more silicides in a non-limiting example. Any unreacted metal may then be removed from the region by for example, performing a selective etching process that may be highly selective so as to be able to remove unreacted metal without affecting the reacted silicide regions. (However, other processes as known to those skilled in the art may also be used to remove the unreacted metal.)

In a non-limiting embodiment, the metal deposited over the region of the silicon substrate 202 may include a refractory metal, such as for example cobalt, nickel, titanium, tantalum, platinum, palladium, rhodium, or combinations thereof. In a non-limiting embodiment, the one or more silicides in the source region 210/220 or drain region 212/222 may include cobalt silicide ($CoSi_2$), nickel silicide (NiSi), titanium silicide ($TiSi_2$), tantalum silicide ($TaSi_2$), platinum silicide (PtSi), palladium silicide (Pd2Si), rhodium silicide (RhSi), or combinations thereof. For example, a nickel or nickel containing alloy may be disposed over the doped region and the nickel-silicon interface above the doped region may be annealed at a temperature of about 450° C. (however, other temperatures as known to those skilled in the art may also be used) for a time period that may allow the nickel or nickel containing alloy to react with the silicon of the doped region to form nickel silicide or a nickel alloy silicide. The annealing may be performed using a rapid thermal anneal (RTP) process or any other process as known to those skilled in the art.

Figure 10A:
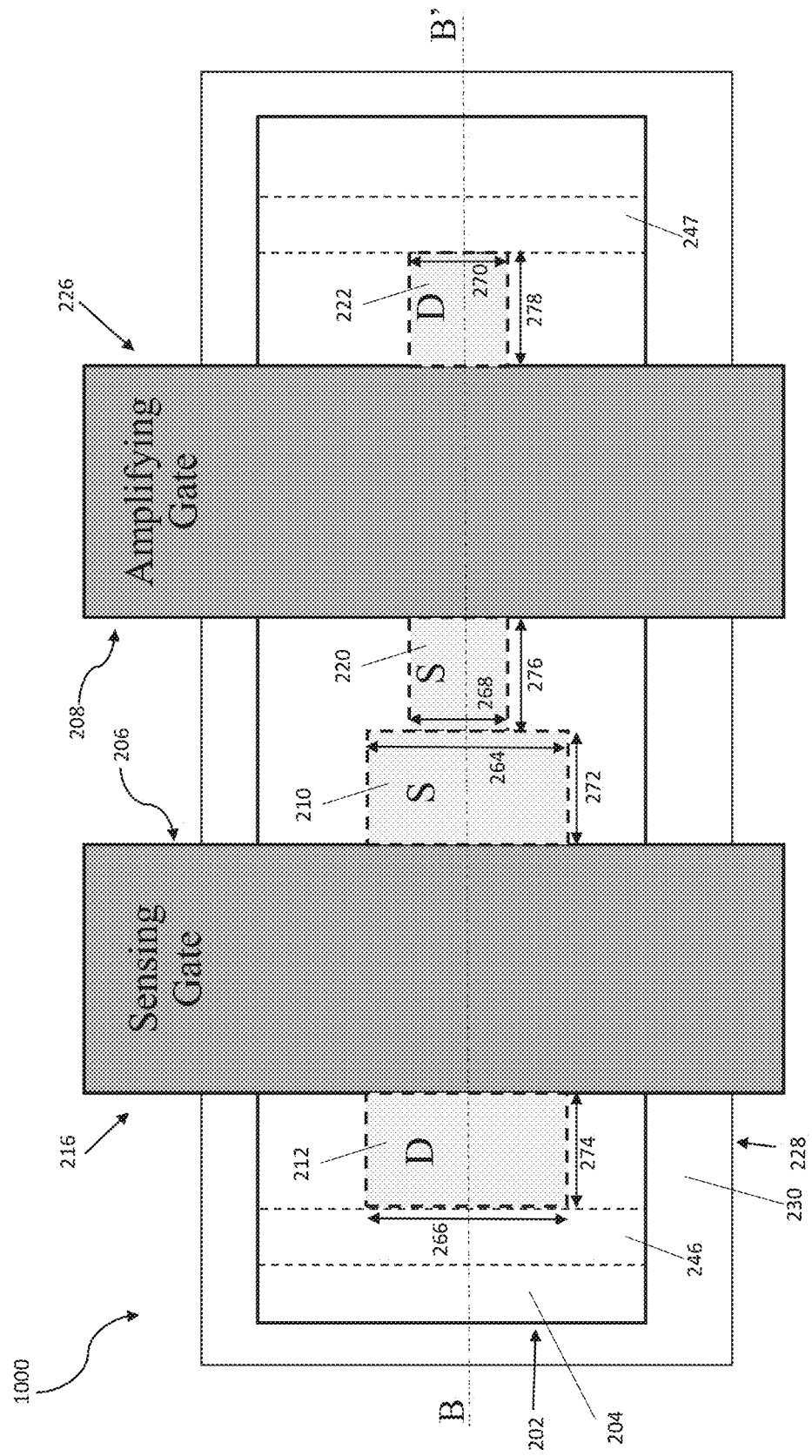
FIG. 10A and FIG. 10B respectively show a top view and a cross-sectional view of a sensor device according to an alternative non-limiting embodiment of the present invention.
Figure 10B:
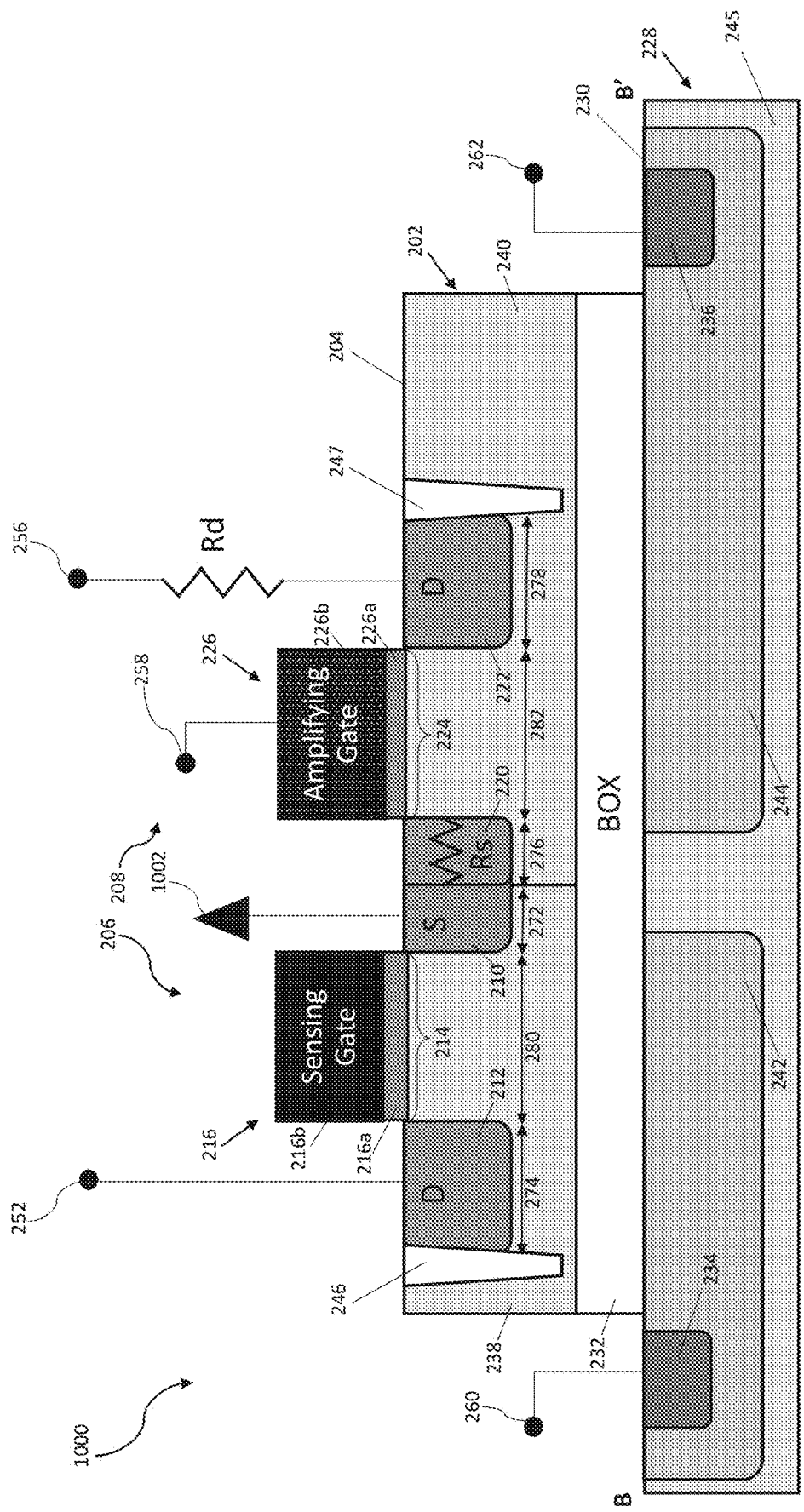
Figure 11:
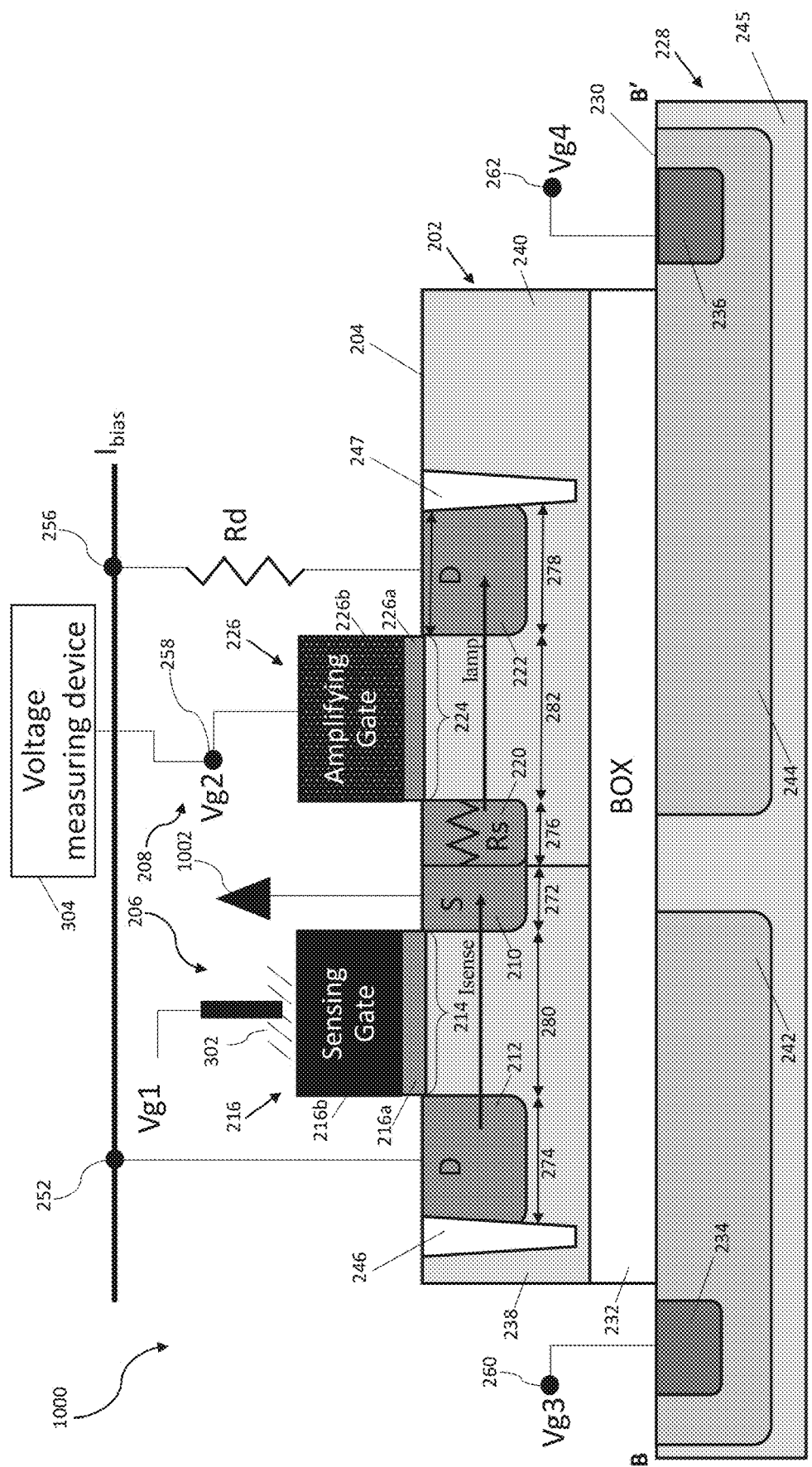
FIG. 11 shows the sensor device of FIGS. 10A and 10B in use.

FIG. 10A shows a top view of a sensor device 1000 for converting biochemical reactions into electrical signals (for example, for detecting a pH change in a solution caused by biochemical reactions by converting the pH change into electrical signals) according to an alternative non-limiting embodiment of the present invention. Sensor device 1000 is similar to sensor device 200, and thus the common features are labelled with the same reference numerals and need not be discussed. FIG. 10B shows a cross-sectional view of the sensor device 1000 along the line B-B'. Referring to FIG. 10A and FIG. 10B, the sensor device 1000 may also include a first semiconductor structure 206 having a first source region 210 and a second semiconductor structure 208 having a second source region 220. However, while the sensor device 200 may include a first source terminal 250 disposed above the first source region 210 and a second source terminal 254 disposed above the second source region 220, the sensor device 1000 may include a single source terminal 1002 for electrical connection of both the first source region 210 and the second source region 220 to an external voltage supply. This single shared source terminal 1002 may help to reduce the size of the sensor device 200 in a non-limiting example. Further, while the first and second source regions 210, 220 may be spaced apart in sensor device 200 with an internal isolation region 248 arranged between the first and second source regions 210, 220, the first and second source regions 210, 220 may be in contact with each other in the sensor device 1000. FIG. 11 shows the sensor device 1000 in use. In a non-limiting example, the sensor device 1000 may operate in the same manner as the sensor device 200 as described above, with the single shared source terminal coupled with an external voltage supply Vss.

Figure 12:
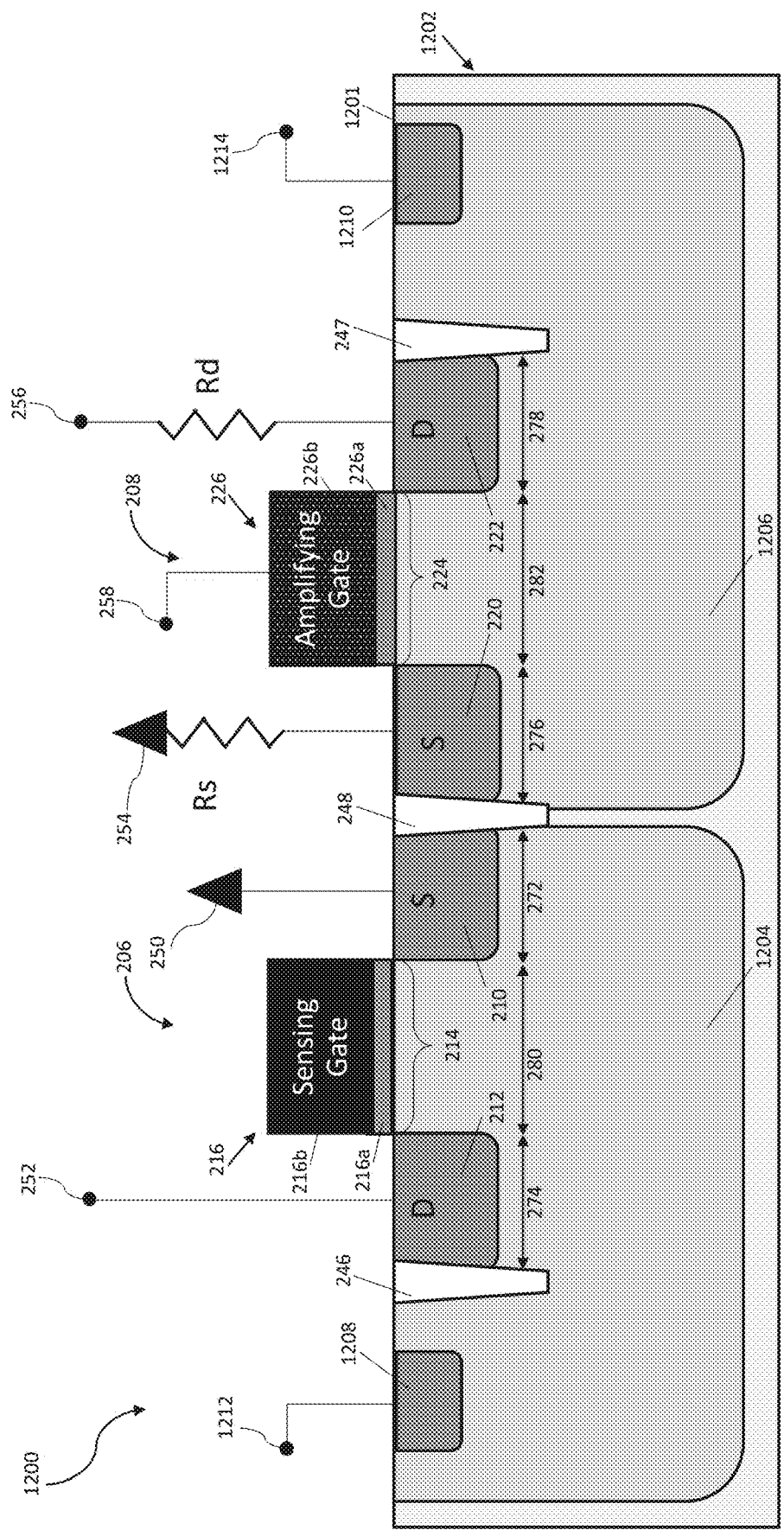
FIG. 12 shows a cross-sectional view of a sensor device according to yet another alternative non-limiting embodiment of the present invention.
Figure 13:
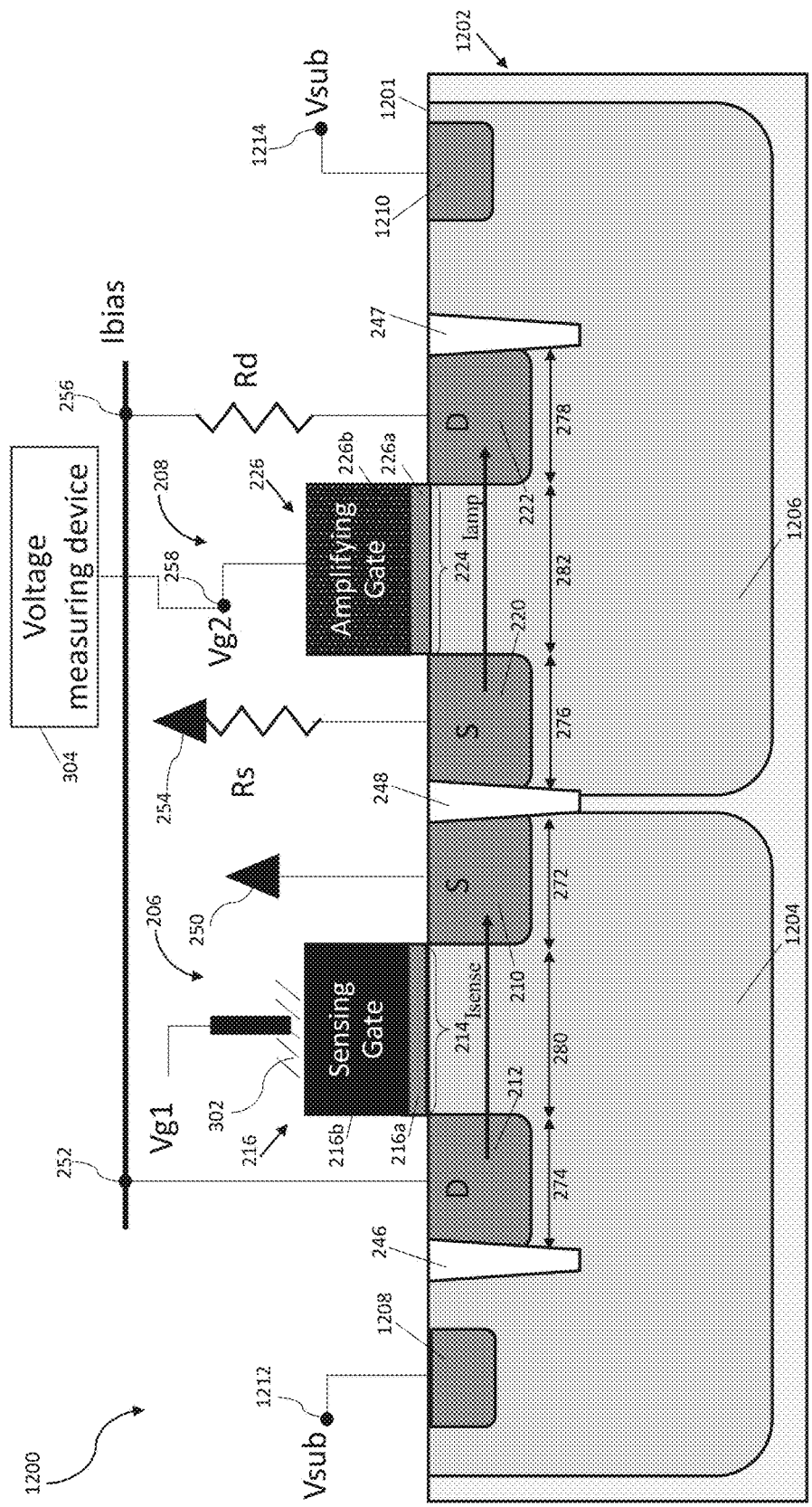
FIG. 13 shows the sensor device of FIG. 12 in use.

FIG. 12 shows a cross-sectional view of a sensor device 1200 for converting biochemical reactions into electrical signals (for example, for detecting a pH change in a solution caused by biochemical reactions by converting the pH change into electrical signals) according to an alternative non-limiting embodiment of the present invention. Sensor device 1200 is similar to sensor device 200, and thus the common features are labelled with the same reference numerals and need not be discussed. Referring to FIG. 12, unlike the sensor device 200, the sensor device 1200 may include only a single substrate 1202 that may be referred to as a bulk substrate in a non-limiting example. The substrate 1202 of the sensor device 1200 may also include a first well 1204 and a second well 1206 in a non-limiting example. However, unlike the sensor device 200 where the first and second wells 238, 240 may be in contact with each other and may, in combination, extend along an entire length of the substrate 202, the first and second wells 1204, 1206 of the sensor device 1200 may be spaced apart from each other without any contact and may, in combination, occupy only a portion of the substrate 1202 in a non-limiting embodiment as shown in FIG. 12. The first source region 210, first drain region 212, second source region 220, second drain region 222 may be at least partially disposed within the substrate 1202 below a surface 1201 of the substrate 1202 in a non-limiting example. For example, the first source region 210 and the first drain region 212 may be at least partially disposed within the first well 1204, whereas the second source region 220 and the second drain region 222 may be at least partially disposed within the second well 1206. Further, while the sensor device 200 may include the third and fourth gate structures 234, 236, the sensor device 1200 may not include these gate structures 234, 236 in a non-limiting embodiment. Instead, the sensor device 1200 may include a first substrate region 1208 and a second substrate region 1210 at least partially disposed within the substrate 1202. In a non-limiting example, the first substrate region 1208 may be at least partially disposed within the first well 1204 and the second substrate region 1210 may be at least partially disposed within the second well 1206. A first substrate terminal 1212 and a second substrate terminal 1214 may be provided above the first substrate region 1208 and the second substrate region 1210 respectively in a non-limiting example. FIG. 13 shows the sensor device 1200 in use. In one non-limiting example, when the sensor device 1200 is in use, the first and second substrate regions 1208, 1210 may each be configured to receive a substrate bias voltage Vsub via the first and second substrate terminals 1212, 1214 respectively, which may allow the sensor device 1200 to operate in the same manner as the sensor device 200 as described above.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

The invention claimed is:

1. A sensor device comprising:
   a substrate;
   a first semiconductor structure comprising:
      a first source region at least partially disposed within the substrate comprising a first source resistance;
      a first drain region at least partially disposed within the substrate;
      a first channel region between the first source region and the first drain region; and
      a first gate structure disposed over the first channel region, wherein the first gate structure is configured to receive a solution and a change in pH in the solution causes a change in a first current flow through the first channel region;
   a second semiconductor structure comprising:
      a second source region at least partially disposed within the substrate comprising a second source resistance;
      a second drain region at least partially disposed within the substrate;
      a second channel region disposed between the second source region and the second drain region; and
      a second gate structure disposed over the second channel region,
      wherein the sensor device is configured such that when the first current flow through the first channel region changes due to the change in pH in the solution, a second current flow through the second channel region changes to compensate for the change in the first current flow through the first channel region to maintain a constant current flow through the sensor device; and wherein the second source resistance is higher than the first source resistance.

2. The sensor device according to claim 1, wherein the second source resistance ranges from 1 kOhm to 500 kOhms.

3. The sensor device according to claim 1, wherein the first drain region comprises a first drain resistance, wherein the second drain region comprises a second drain resistance, and wherein the second drain resistance is higher than the first drain resistance.

4. The sensor device according to claim 1, wherein each of the first source region and the second source region comprises one or more dopants, and the second source region comprises a lower concentration of dopants as compared to the first source region.

5. The sensor device according to claim 1, wherein each of the first drain region and the second drain region comprises one or more dopants, and the second drain region comprises a lower concentration of dopants as compared to the first drain region.

6. The sensor device according to claim 1, wherein the second source region comprises a concentration of dopants lower than $1 \times 10^{19}/cm^3$.

7. The sensor device according to claim 1, wherein the second drain region comprises a concentration of dopants lower than $1 \times 10^{19}/cm^3$.

8. The sensor device according to claim 1, wherein the first source region comprises one or more silicides and one or more silicides is absent from the second source region.

9. The sensor device according to claim 1, wherein the first drain region comprises one or more silicides and one or more silicides is absent from the second drain region.

10. The sensor device according to claim 1, wherein a width of the second source region is less than a width of the first source region.

11. The sensor device according to claim 1, wherein a width of the second source region compared to a width of the first source region has a ratio ranging from 1:1 to 1:1000.

12. The sensor device according to claim 1, wherein a width of the second drain region is less than a width of the first drain region.

13. The sensor device according to claim 1, wherein a width of the second drain region compared to a width of the first drain region has a ratio ranging from 1:1 to 1:1000.

14. The sensor device according to claim 1, further comprising a source terminal for electrical connection of the second source region to an external voltage supply and further comprising a resistance element between the second source region and the source terminal.

15. The sensor device according to claim 1, wherein the substrate comprises a first well and a second well, and wherein the first source region and the first drain region are at least partially disposed within the first well, and the second source region and the second drain region are at least partially disposed within the second well.

16. The sensor device according to claim 1, wherein the sensor device comprises a single source terminal for electrical connection of the first source region and the second source region to an external voltage supply.

17. The sensor device according to claim 1, further comprising:
a further substrate arranged below the substrate; and
an oxide layer between the substrate and the further substrate.

18. The sensor device according to claim 17, further comprising:
a third gate structure at least partially disposed within the further substrate, the third gate structure configured to receive a first bias voltage to affect the first current flow through the first channel region.

19. The sensor device according to claim 17, further comprising:
a fourth gate structure at least partially disposed within the further substrate, the fourth gate structure configured to receive a second bias voltage to affect the second current flow through the second channel region.

20. A method comprising:
obtaining a substrate having a first semiconductor structure formed thereon; wherein the first semiconductor structure comprises a first source region at least partially disposed within the substrate comprising a first source resistance, a first drain region at least partially disposed within the substrate, a first channel region between the first source region and the first drain region, and a first gate structure disposed over the first channel region and configured to receive a solution; wherein a change in pH in the solution causes a change in a first current flow through the first channel region;
forming a second semiconductor structure, wherein forming the second semiconductor structure comprises:
disposing a second source region at least partially within the substrate comprising a second source resistance;
disposing a second drain region at least partially within the substrate;
disposing a second channel region between the second source region and the second drain region; and
disposing a second gate structure over the second channel region,
wherein the sensor device is configured such that when the first current flow through the first channel region changes due to a change in pH in the solution, a second current flow through the second channel region changes to compensate for the change in the first current flow through the first channel region to maintain a constant current flow through the sensor device; and
wherein the second source resistance is higher than the first source resistance.

* * * * *